(12) United States Patent
Sorensen et al.

(10) Patent No.: US 10,253,944 B1
(45) Date of Patent: Apr. 9, 2019

(54) LIGHT FIXTURE WITH COMPOUND CURVATURE, FOR EXAMPLE, FOR LARGE FORMAT LIGHTING APPLICATIONS

(71) Applicant: ABL IP HOLDING LLC, Conyers, GA (US)

(72) Inventors: Christopher Jay Sorensen, Denver, CO (US); Carl T. Gould, Golden, CO (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/927,269

(22) Filed: Mar. 21, 2018

(51) Int. Cl.
| | |
|---|---|
| *F21V 1/00* | (2006.01) |
| *F21V 3/02* | (2006.01) |
| *F21V 8/00* | (2006.01) |
| *F21V 15/01* | (2006.01) |
| *F21V 7/00* | (2006.01) |

(52) U.S. Cl.
CPC ............. *F21V 3/02* (2013.01); *F21V 7/0033* (2013.01); *F21V 15/01* (2013.01); *G02B 6/0051* (2013.01)

(58) Field of Classification Search
None
See application file for complete search history.

(56) References Cited

U.S. PATENT DOCUMENTS

| | | | |
|---|---|---|---|
| 4,068,920 A | 1/1978 | Bass et al. | |
| 9,851,094 B2 | 12/2017 | Gommans et al. | |
| 2002/0054428 A1* | 5/2002 | Seward | G02B 6/4206 359/362 |
| 2002/0196554 A1* | 12/2002 | Cobb | G02B 27/0172 359/633 |
| 2018/0113244 A1 | 4/2018 | Vasylyev | |
| 2018/0226014 A1 | 8/2018 | Komanduri et al. | |

OTHER PUBLICATIONS

U.S. Appl. No. 16/106,969, entitled "Light Fixture Using a Light Waveguide With Compound Curvature," filed Aug. 21, 2018, 110 pages.
Neonny, "Architectural Light-Double Curvature Series," downloaded Apr. 4, 2018, at https://www.neonny.com/architectural-light-double-curvature, 5 pages.
Notice of Allowance for U.S. Appl. No. 16/106,969, dated Feb. 7, 2019, 17 pages.

* cited by examiner

*Primary Examiner* — Vip Patel
(74) *Attorney, Agent, or Firm* — RatnerPrestia

(57) ABSTRACT

A light fixture example includes a housing, a light source in the housing and a diffuser. The diffuser is supported by the housing at a distance from the source so as to receive light from the source and diffuse the light for illumination. The diffuser has a three-dimensional compound curvature and a perimeter with at least two edges connected at vertices. Each such edge is a two-dimensional plane curve. The at least two edges are not coplanar with each other. In some examples, a back panel of the housing may have a similar three-dimensional compound curvature and perimeter.

35 Claims, 30 Drawing Sheets

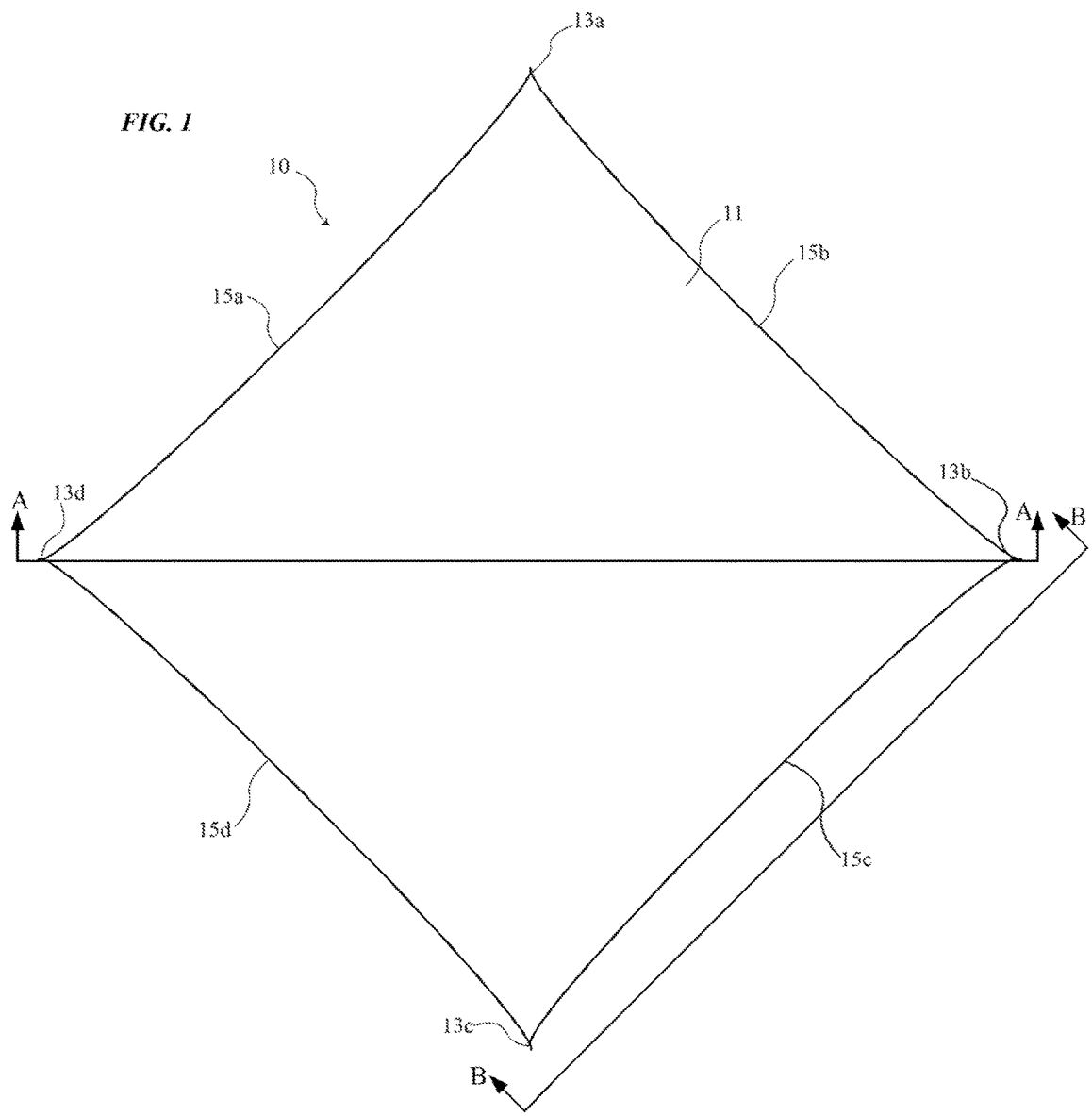

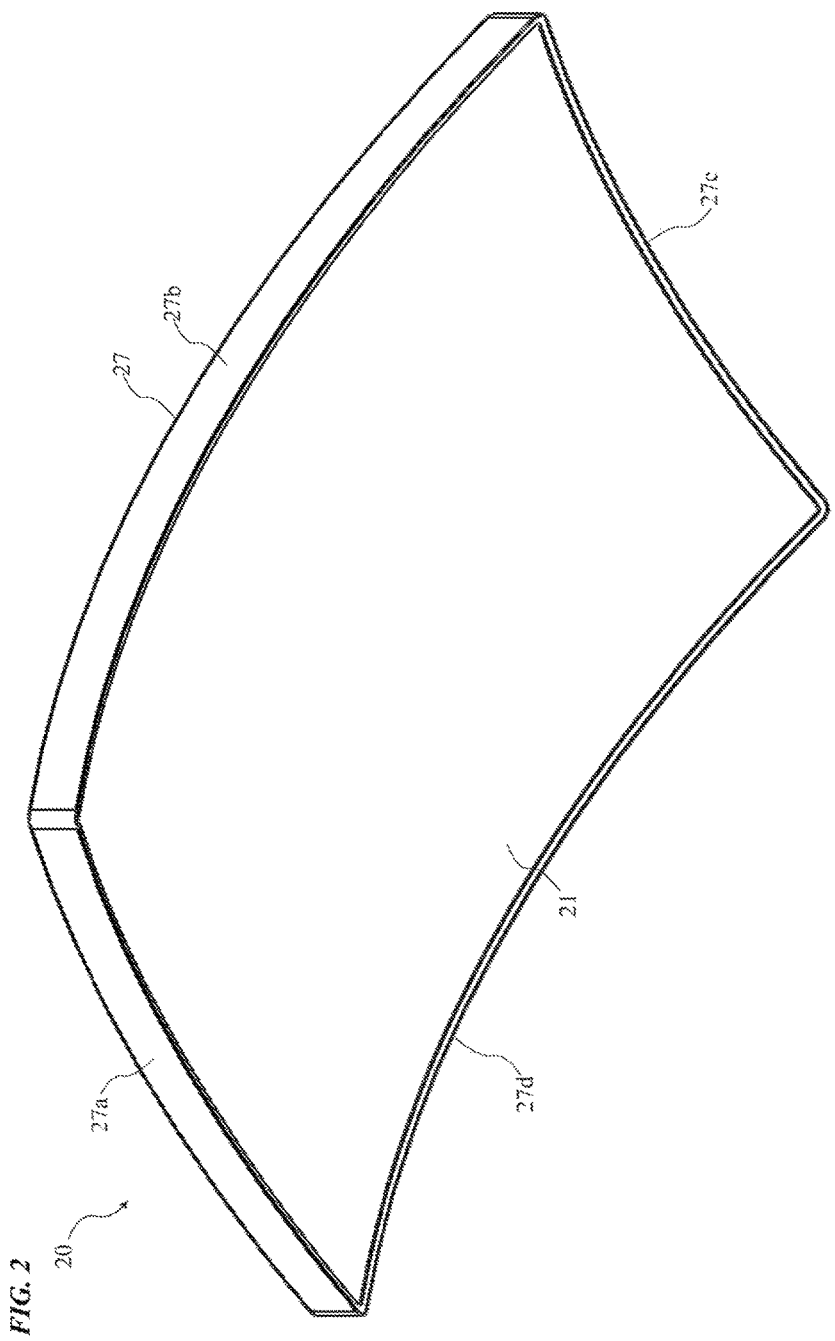

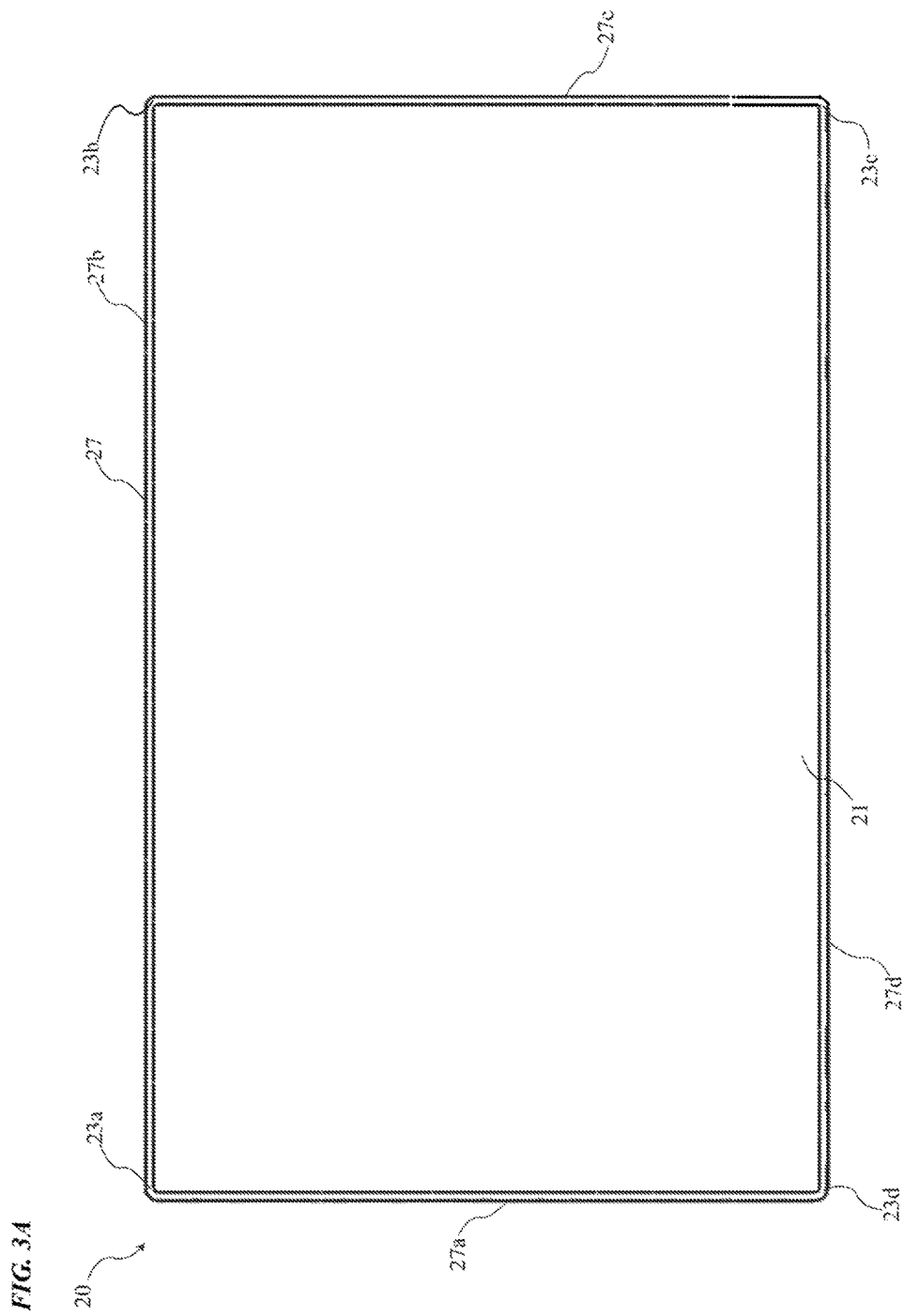

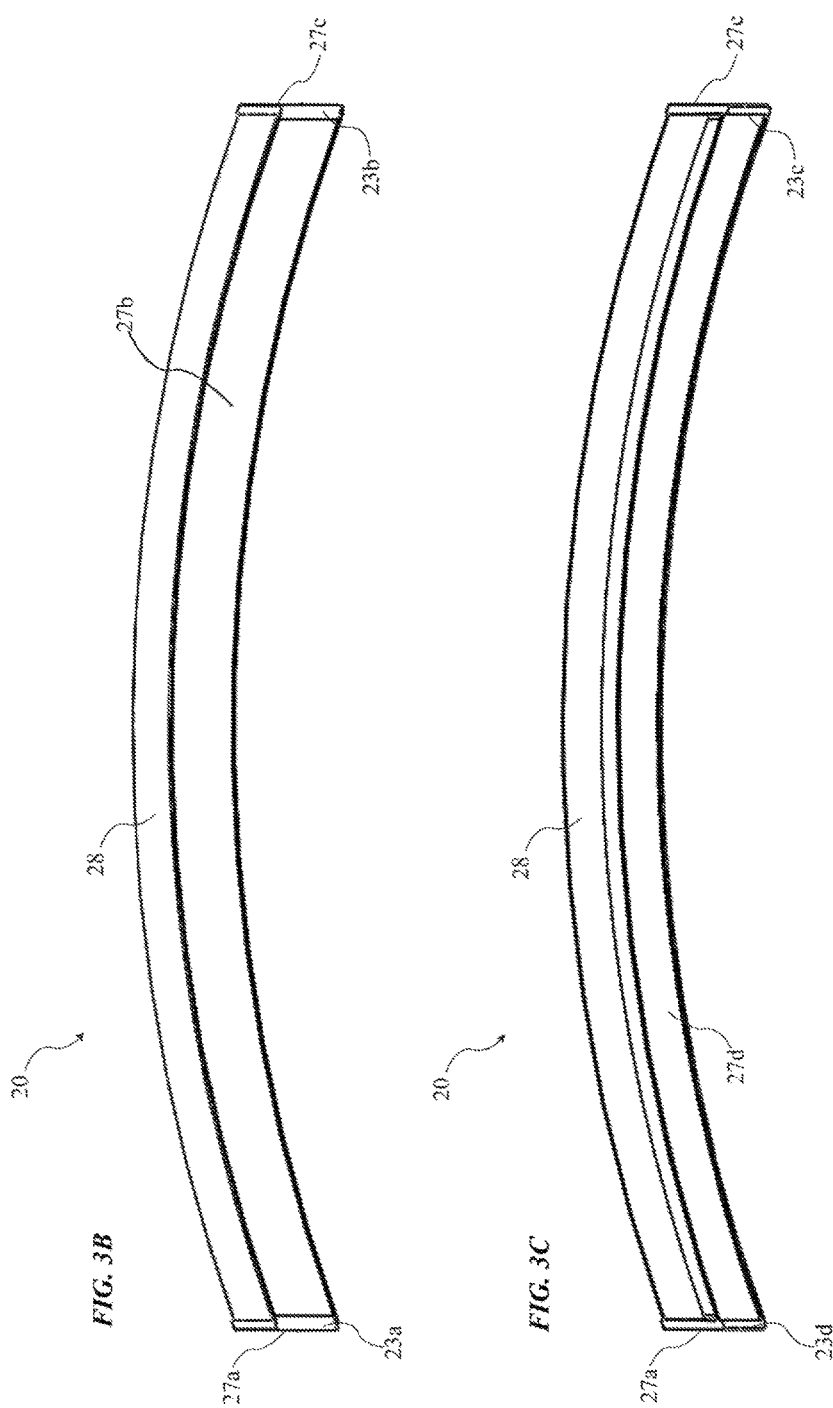

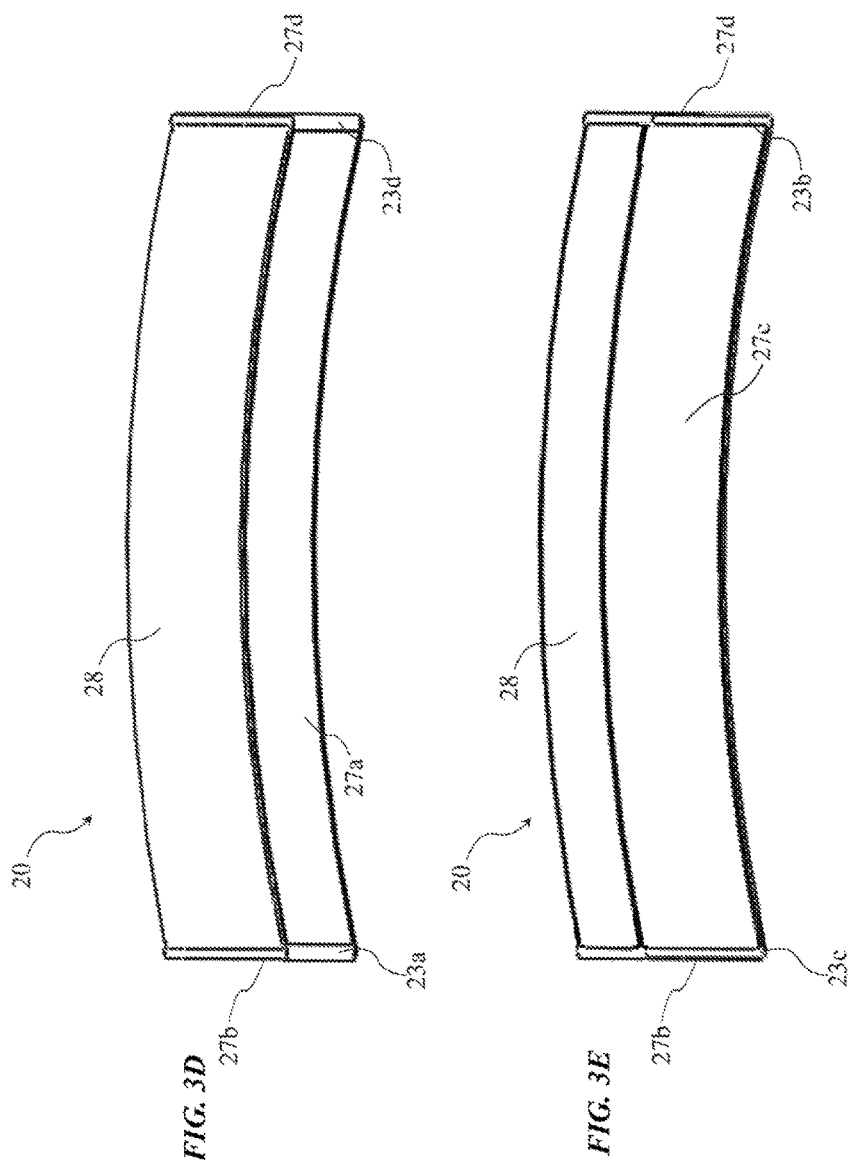

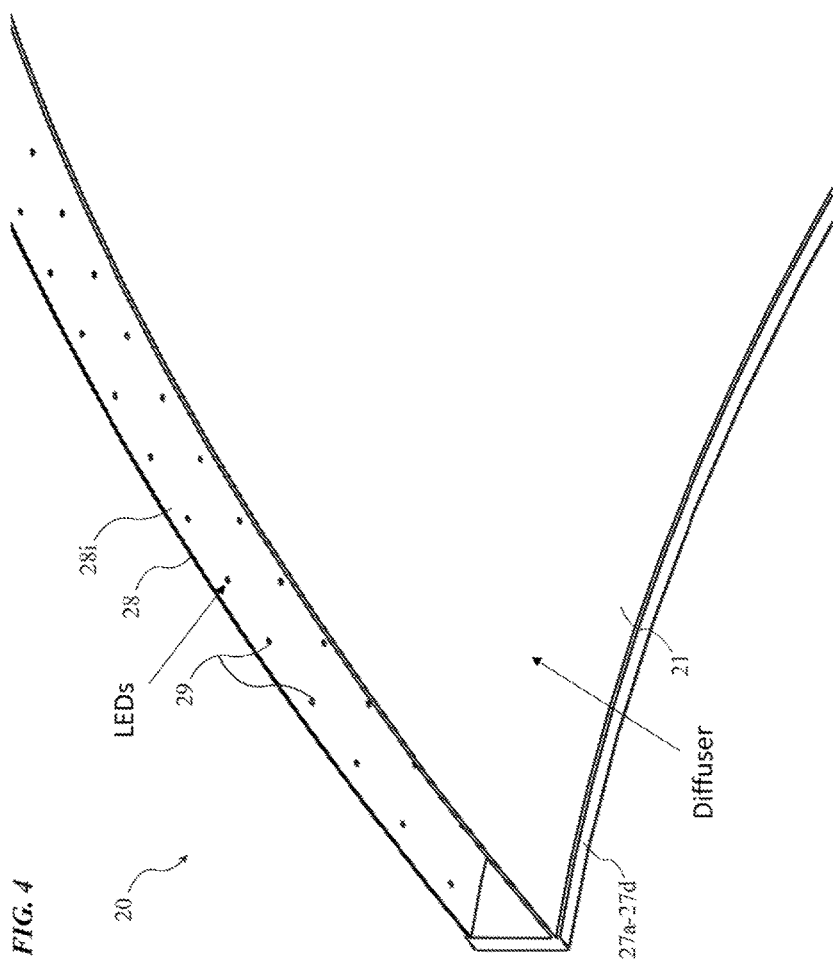

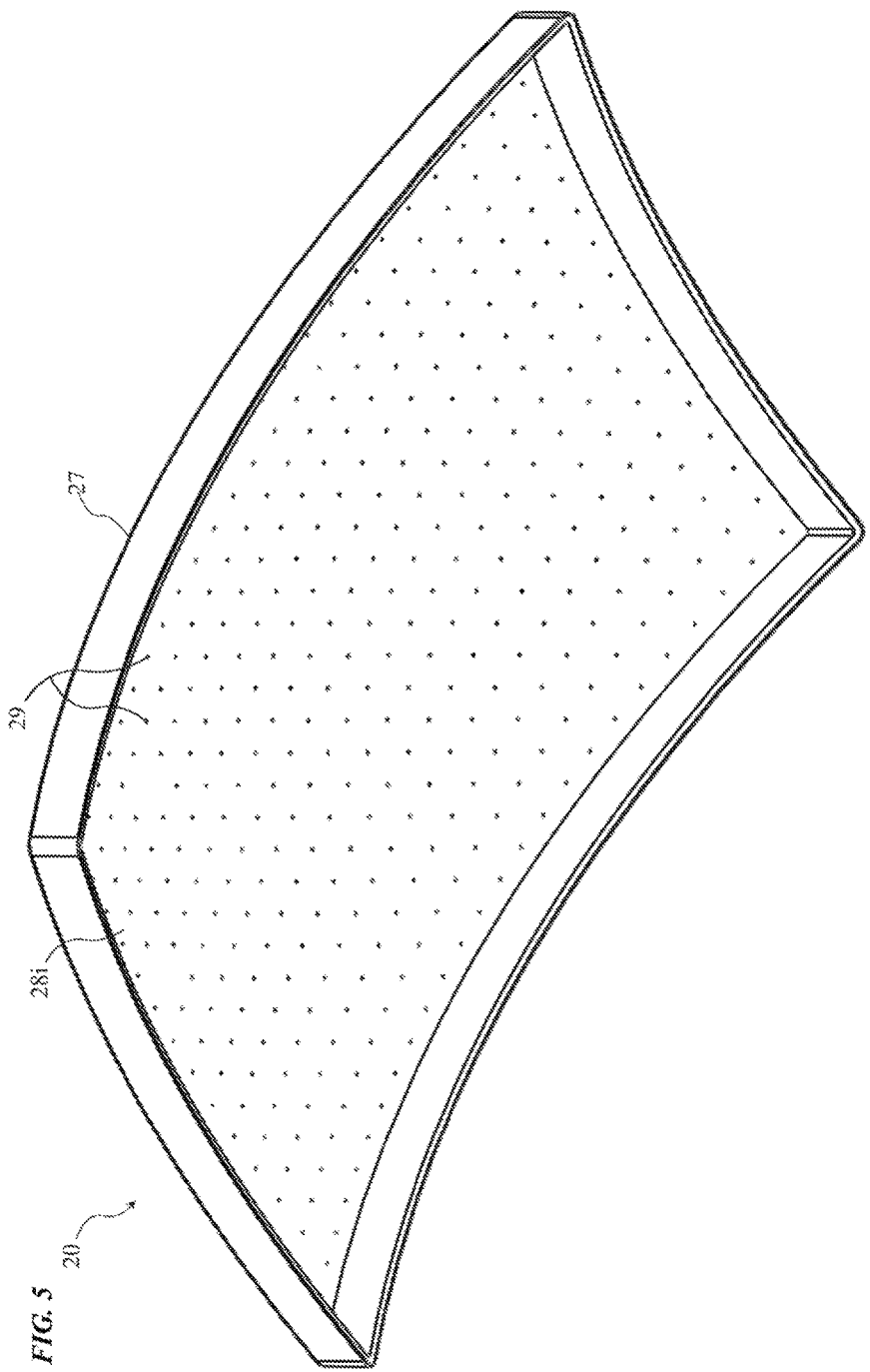

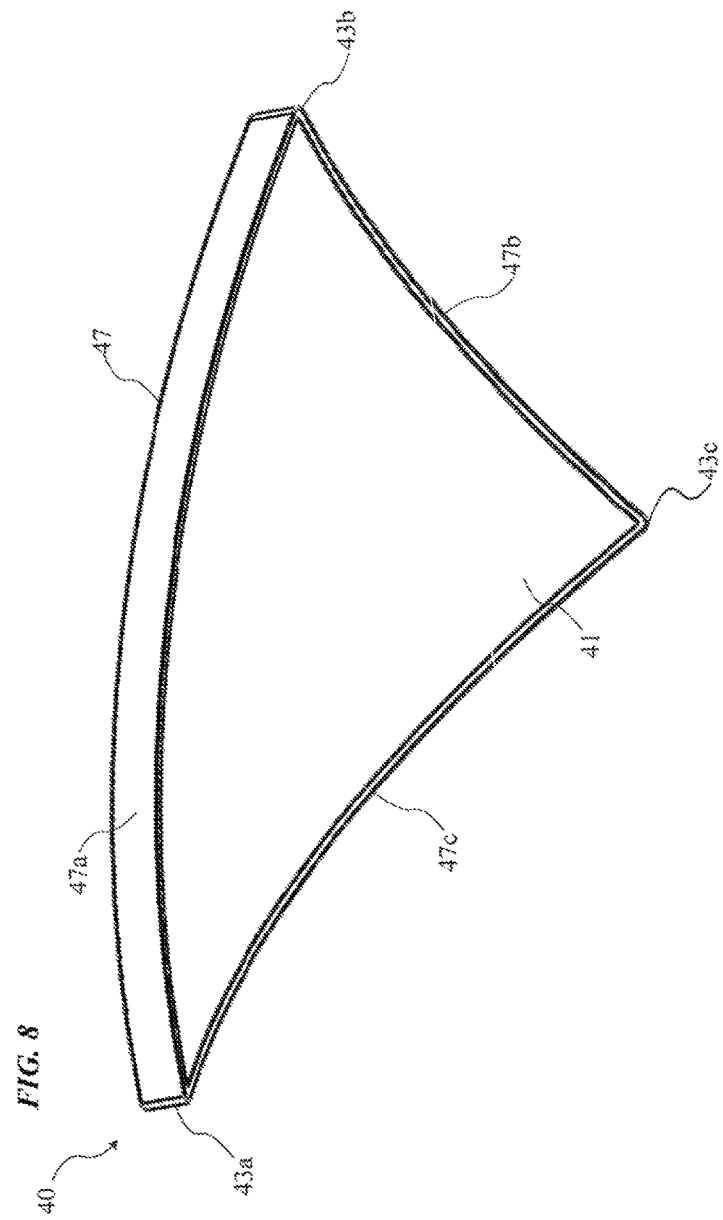

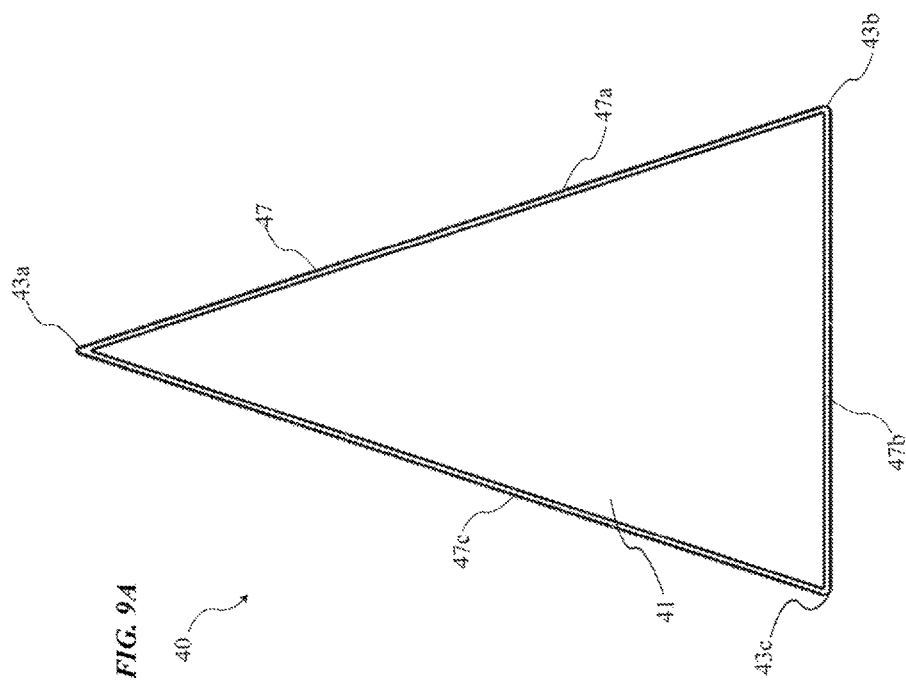

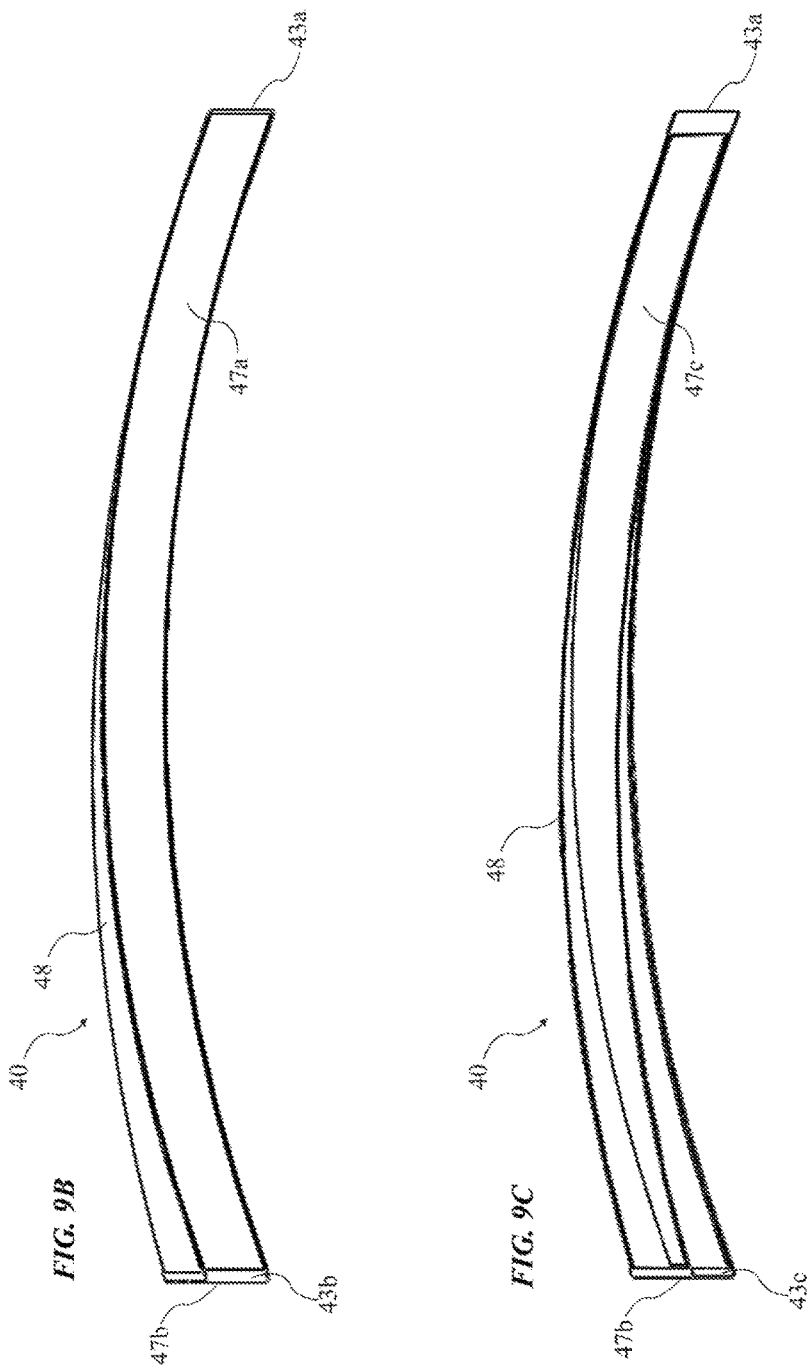

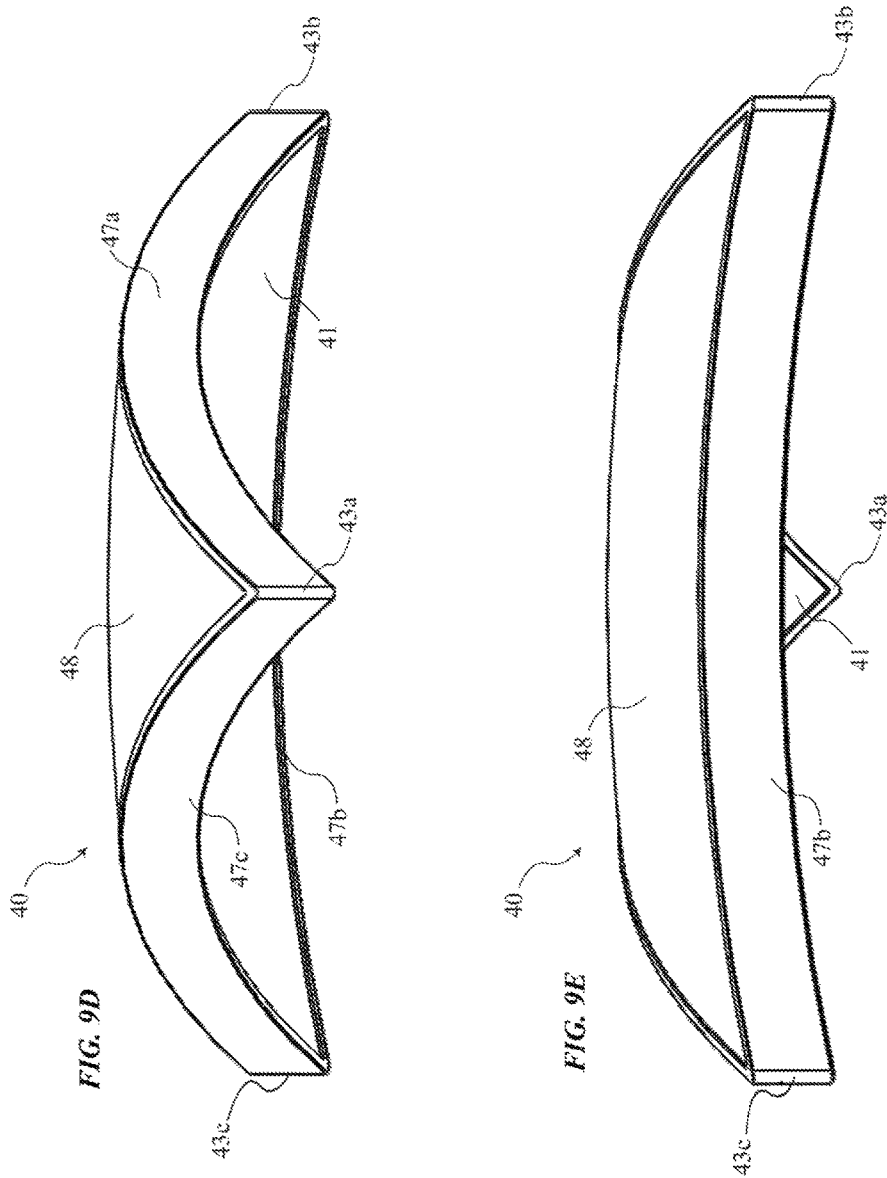

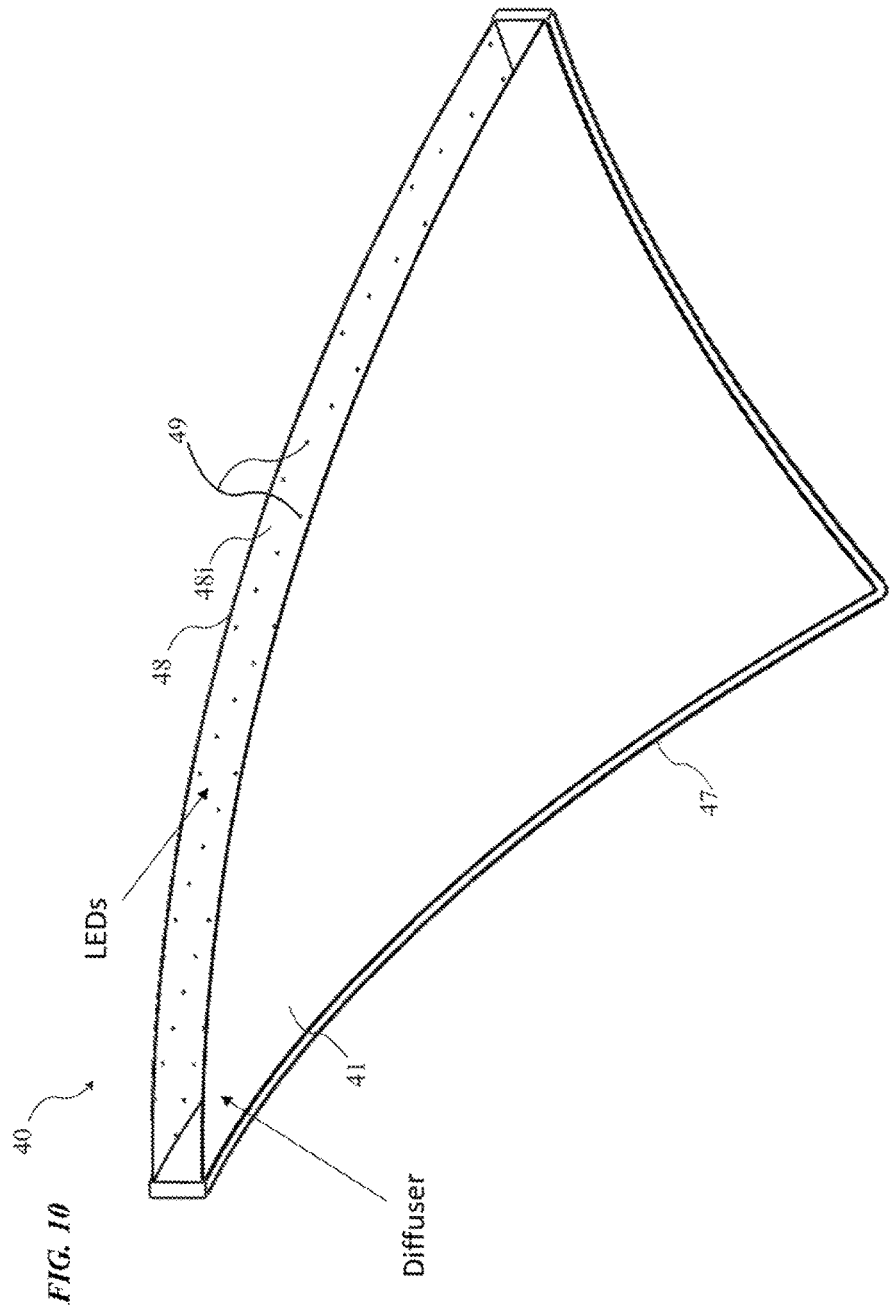

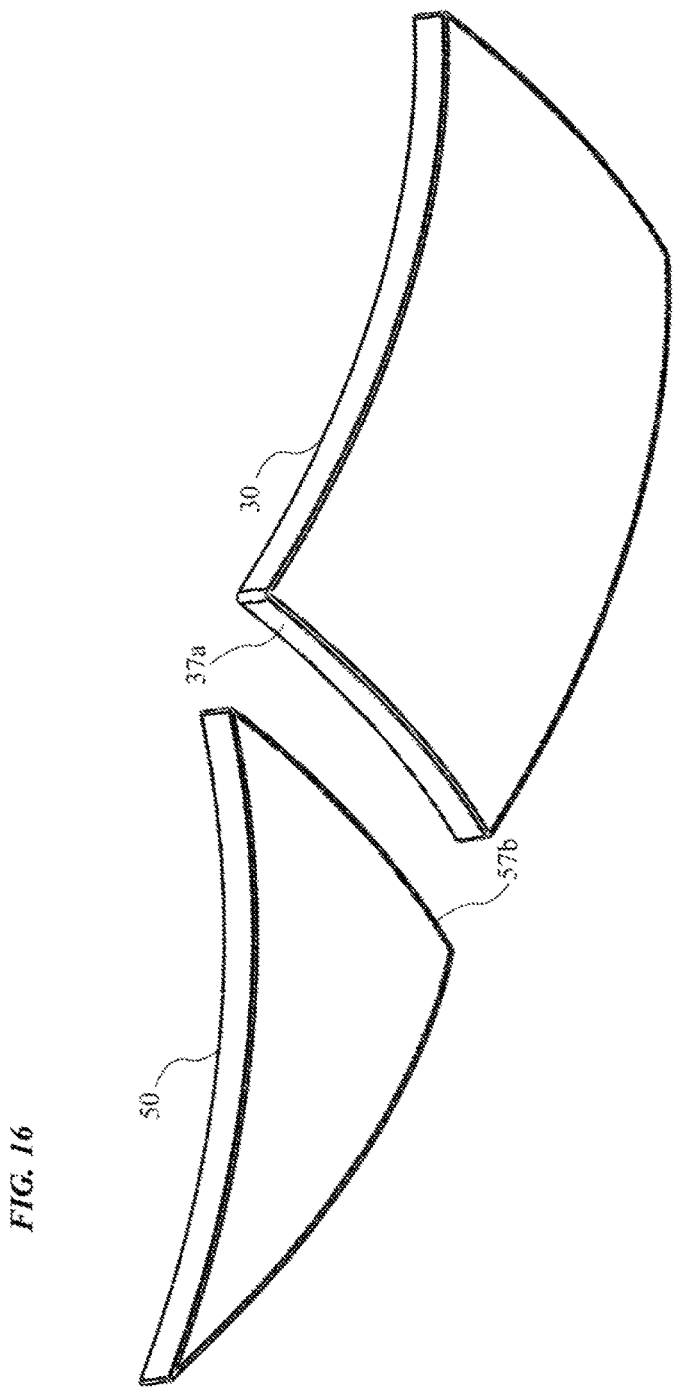

LIGHT FIXTURE WITH COMPOUND CURVATURE, FOR EXAMPLE, FOR LARGE FORMAT LIGHTING APPLICATIONS

TECHNICAL FIELD

The present subject matter relates to light fixtures, for example, configured for large format illumination applications, in which the diffuser and possibly a panel of the fixture housing has a compound curvature.

BACKGROUND

Electrically powered artificial lighting has become ubiquitous in modern society. Electrical lighting devices or luminaires, such as light fixtures or lamps, are commonly deployed, for example, in residences, buildings of commercial and other enterprise establishments, as well as in various outdoor settings.

In recent years, there have been increasing demands for effective and aesthetically pleasing lighting for spaces with open architectures, including many with high ceilings. In many cases, light fixtures for such applications are hung at some distance below the ceiling, although not necessarily as low as the more traditional eight to ten foot ceiling heights in office or older residential buildings. Traditional large scale luminaires (e.g. drums, bowl pendants) often do not efficiently provide enough useful light to serve as the ambient layer. Such products are visually massive due to their vertical height. Higher efficient products designed for higher mounting heights, such as high bay light fixtures or high output cylinder fixtures, come with high luminance and the potential for glare.

It may also be useful in large spaces to sub-divide the area into smaller virtual areas or zones of association or intimacy for a specific function without walls; and the lighting for such smaller areas or zones is configured to provide separately controllable illumination at appropriate levels within those areas or zones.

Also, existing large format luminaires have very limited form factors or are built in place. The main light emitting surface in these form factors typically are flat cylindrical, hemispherical or semi-cylindrical, which may unduly limit appearance as well as lighting performance, particularly for applications in large open spaces and/or spaces with open ceilings.

Satisfying these competing demands has led manufacturers to customize light fixtures to specialized applications in different parts of different customers' buildings. Customized light fixtures, however, come at substantially higher cost than mass produced light fixtures.

SUMMARY

There is room for further improvement in the structure and arrangement of lighting fixtures to address modern lighting design requirements, e.g. to alleviate one or more of the above noted problems with lighting particularly for open ceiling and/or open concept spaces.

A light fixture described in detail below and shown in the drawings, for example, includes a housing, a light source in the housing and a diffuser. The diffuser is supported by the housing at a distance from the source so as to receive light from the source and diffuse the light for illumination. The diffuser has a three-dimensional compound curvature and a perimeter with at least two edges connected at vertices. Each such edge is a two-dimensional plane curve. The at least two edges are not coplanar with each other.

In another example a light fixture as outlined in the previous example with the curved diffuser, the housing has a back panel and two or more sidewalls. At least one interior surface on the back panel or the sidewalls is reflective. In such an example, the light source is located in the housing to emit light for passage through the diffuser. Also in this example, the back panel, much like the diffuser, has a three-dimensional compound curvature and a perimeter with at least two edges connected at vertices. Each such edge of the back panel is a two-dimensional plane curve. The at least two edges of the perimeter of the back panel are not coplanar with each other.

The detailed description and drawings also teach a system having two of the light fixtures with the curved diffuser. In such a system, for example, in order to facilitate mounting of the first light fixture near the second light fixture with predetermined edges facing towards each other in a modular design arrangement, the distance between vertices at ends of a predetermined edge of the perimeter of the diffuser of the first fixture is approximately the same as the distance between vertices at ends of a predetermined edge of the perimeter of the diffuser of the second fixture.

By way of another example, a light fixture may include a housing and a light source and an optical element supported by the housing. The optical element has a surface forming a light output surface of the light fixture. The optical element is located to receive light from the source and is configured to supply the light for illumination, via the output surface. At least that surface of the optical element has a three-dimensional compound curvature and a perimeter that includes two or more edges connected at vertices. Each of those edges is a two-dimensional plane curve, and those edges are not coplanar with each other.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 1 is a plan view looking at the diffuser of a first example of a light fixture.

FIG. 2 is an isometric view of another example of a light fixture.

FIG. 3A is a front view, FIGS. 3B and 3C are opposite side views, and FIGS. 3D and 3E are opposite end views of the light fixture of FIG. 2.

FIG. 4 is a partial isometric view of the light fixture of FIG. 2, with a side rail removed to show some of the interior of the fixture.

FIG. 5 is an isometric view of the light fixture of FIG. 2, with the diffuser removed to show some of the interior of the fixture including solid state light emitters mounted at locations on a back panel of the housing of the fixture.

FIG. 8 is an isometric view of another example of a light fixture.

FIG. 9A is a front view, FIGS. 9B and 9C are opposite side views, and FIGS. 9D and 9E are opposite end views of the light fixture of FIG. 8.

FIG. 10 is an isometric view of the light fixture of FIG. 8, with one of the side rails of the housing removed to show some of the interior of the fixture.

FIG. 16 illustrates an example of a system having two example light fixtures mounted in a modular design arrangement.

DETAILED DESCRIPTION

Figure 1A:
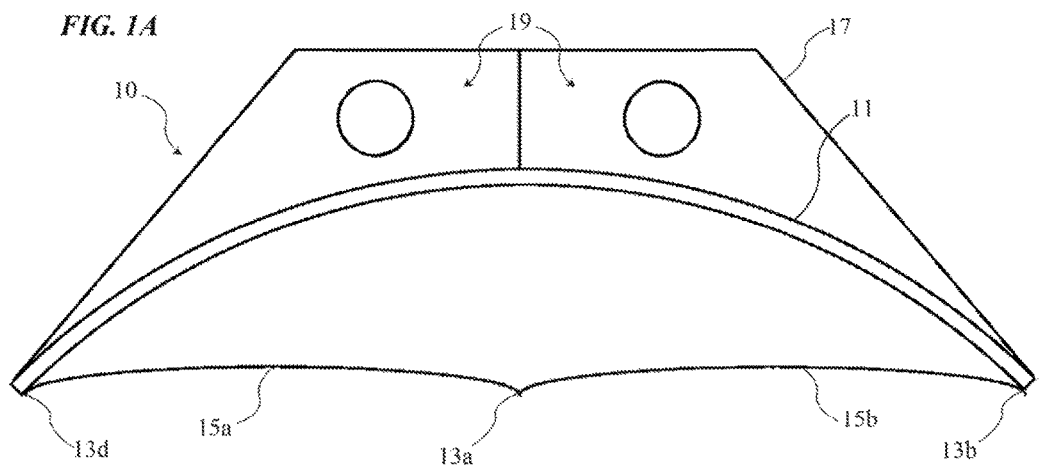
FIG. 1A is a cross-sectional view of the light fixture along the diagonal A-A of FIG. 1.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The concepts described herein and shown in the drawings improve over the art by providing light fixtures using diffusers or other optical elements with a three-dimensional compound curvature (e.g. at least at an appropriate output surface) and a perimeter with at least two edges connected at vertices. Each such edge is a two-dimensional plane curve. The edges are not coplanar with each other.

In some examples, housing panels also may have such a three-dimensional compound curvature. Sidewalls of the housing may follow the plane curve edges of the compound curvature of the diffuser and possibly the compound curvature of the back panel of the housing. In some examples, if parallel edges of the diffuser and back panel along one side of a fixture lie in a plane, the sidewall for that side of the fixture housing would have one or more major surfaces that lie in or are parallel to that same plane. Housing panels forming or serving as such planar sidewalls allow for manufacturing components of the present geometry to be extruded and/or rolled. Generally all manufacturing methods are made easier via having a single flat or planar surface.

Light fixture examples discussed below may support large format applications, for example, for diffuse general illumination in large open spaces, even where a space may have a high ceiling. In general, a light fixture for a large format application provides a light emitting surface having an area larger than that of a 2×2 troffer. Also, a fixture for a large format application provides a higher amount of more spread out lumens of output light, e.g. reducing glare and shadowing effects.

Traditional large scale luminaires (e.g. drums, bowl pendants) often do not efficiently provide enough useful light to serve as the ambient layer. Such products are visually massive due to their vertical height. Higher efficient products designed for higher mounting heights, such as high bay light fixtures or high output cylinder fixtures, come with high luminance and the potential for glare. The utility in the large format light emitting surface of fixtures of the curved geometry described and shown herein is the total lumens of the fixture can be very high with very low luminance (no glare) and reduced shadowing effects. Fixtures with high lumen output allow the reduction of the number of luminaires in a space. The large but thin form factor of a number of the examples of light fixtures shown and described herein has more commensurate proportions to open ceiling modern architecture.

The curved structural fixture configurations may provide a pleasing aesthetic for lighting designs in high ceiling spaces. Large format compound curvature with planar edges, for example, may blend natural semi-organic form with architectural applicability. Alternatively or in addition, sail-like curvature across forms may evoke flow and energy while the large format provides visual comfort and architectural scale for space definition.

The curved structure may also enable combining a number of such light fixtures in a modular design arrangement, for example, if the fixtures are mass produced in a number of standard sizes and shapes. Use of groups of the fixtures may be deployed to provide defined lighting in desired parts of a larger space, which can assist an architect or lighting designer to arrange intimate smaller areas for particular tasks or functions within a larger open floor plan.

The term "luminaire" encompasses essentially any type of device that processes energy to generate or supply artificial light, for example, for general illumination of a space intended for use of occupancy or observation, typically by a living organism that can take advantage of or be affected in some desired manner by the light emitted from the device. A light fixture is one of a class of luminaires intended to be mounted to a fixed structure. For interior applications, for example, a light fixture may be mounted on any suitable structural element of a building, such as in or on a ceiling, floor or wall, hung below the ceiling, installed as a bollard or the like mounted on the floor, etc. Although most often intended to provide artificial lighting for human occupants, a light fixture may provide light for use by automated equipment, such as sensors/monitors, robots, etc. that may occupy or observe the illuminated space, instead of or in addition to light provided for an organism. However, it is also possible that one or more light fixtures in or on a particular premises have other lighting purposes, such as signage for an entrance or to indicate an exit. In most examples, the light fixture(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a light fixture may be any type of artificial light emitting device, several examples of which are included in the discussions below.

Terms such as "artificial lighting," as used herein, are intended to encompass essentially any type of lighting that produces light by processing of electrical power to generate the light. An artificial lighting type device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Many of the shapes shown in the drawings are described herein using geometric terms, like compound curvature, perimeter, edge, vertex, vertices, radius, angle, perpendicular, circle, polygon, ovoid, oblate spheroid, and sphere or spherical. As used herein, however, such terms are intended to describe geometric features of light fixtures and components of light fixtures within a range of tolerance feasible for modern manufacturing technologies, rather than an absolute degree of mathematical precision. Also, the descriptions of aspects or features of the light fixture examples or components of the fixture examples are shown and described in an open-ended fashion and do not necessarily exclude additional aspects or features. For example, a perimeter may be shown and described as having some number of edges connected at vertices. Additional edges and/or vertices may be provided. The vertices of a perimeter, for example, may not be sharp corners but may be formed as curved joints between the specified edges (and the curved fillets may be considered additional edges of the perimeter).

Unless otherwise stated, any and all geometrical features, measurements, values, ratings, positions, magnitudes, sizes, angles, and other specifications that are set forth in this specification, including in the claims, are approximate, not exact. Such amounts are intended to have a reasonable range that is consistent with the functions to which they relate and with what is customary in the art to which they pertain. For example, unless expressly stated otherwise, an "approximate" geometric shape or relationship, parameter value or the like may vary by as much as ±10% from the stated shape, relationship or amount.

A number of points in space, in this case forming two or more edges of a perimeter (e.g. of a perimeter of a diffuser or back panel), would be coplanar if there is a plane that contains all the points. Conversely, edges are not coplanar if there is no one geometric plane that contains all the points of the particular edges.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from a fixture example disclosed herein may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the device.

Figure 1B:
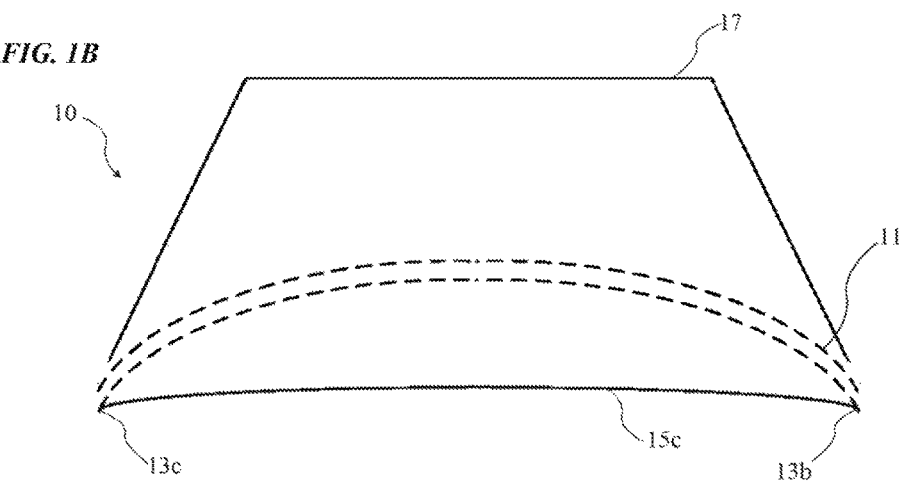
FIG. 1B is a side view the light fixture along the line B-B of FIG. 1.

Reference now is made in detail to the examples illustrated in the accompanying drawings and discussed below. FIGS. 1, 1A and 1B are views of a first example of a light fixture 10. FIG. 1 is a plan view of the fixture 10 as if looking into the diffuser 11 of the fixture 10. An optical element, for example, having a surface forming a light output surface of the light fixture 11, has a compound curvature, e.g. at the output surface, an input surface of the element and/or of the overall element structure. In this first example, the diffuser 11 is the optically transmissive element and has the compound curvature. Although some variations may only have such curvature on the output surface, most examples like FIGS. 1 to 13 have a diffuser that is curved so that both input and output surfaces exhibit compound curvatures. The example diffuser 11 therefore has a three-dimensional compound curvature and a perimeter with at least two edges connected at vertices. Each such edge is a two-dimensional plane curve. In the examples, none of the two-dimensional plane curve type edges are coplanar with each other, although there may be some edges that are coplanar with each other in some curved geometries. In the examples shown, all of the two-dimensional plane curve type edges are not coplanar relative to each other.

In this example, the diffuser curvature is concave relative to the central axis through the diffuser which also is the central axis of light emission from the fixture 10 through the diffusers. Although a concave example is shown, the diffuser 11 may be convex relative to the central axis in the direction through the diffuser. The diffuser 11 may be made of any suitable material that may be formed into the desired curved shape and provide efficient light propagation out of the fixture 10 and diffusion of the light output. The diffuser 11, for example, may be a solid sheet of suitable translucent Polycarbonate, glass, plastic or acrylic, or a fabric material, etc. although structures with openings through the structure of the diffuser 11 also may be used. Depending on materials and possibly other factors, compound curvature may be achieved via a variety of methods, including by way of examples: thermoforming, vacuum forming, injection molding, drape forming, hydro forming, or assembly methods. One assembly method may involve closing a frame around a flat sheet material and forcing the sheet into compound curvature by securing the plane curve sheet edges (e.g. curved edges 15a to 15d) with frame rails of two-dimensional curved geometry. The two-dimensional curved geometry of the assembled rails are that of the respective edges of a compound curvature surface, such as the geometry of edges 15a to 15d of the diffuser. Standard manufacturing tolerances associated with these methods may invoke slight deviations from theoretically perfect geometry of the compound curvature surface.

In the first example, the diffuser 11 has four perimeter edges and four vertices 13a to 13b. Diffusers and possibly other elements of the light fixture structures under consideration here may have two, three, four or more curved edges and vertices, although for the fixture sizes discussed later and formed using current manufacturing techniques, there may be some upper limit to the feasible number of edges and vertices around ten or so. The perimeter in the example includes four curved edges 15a to 15d. The edges are two-dimensional plane curves. The vertices 13a to 13d are coplanar in the illustrated example, although some fixtures may have vertices that are not coplanar. The two-dimensionally curved edges 15a to 15d are not all coplanar with each other.

In this example, the planes of the two-dimensional edge curves are slanted somewhat inward relative to the two-dimensional plane of the view in FIG. 1; and as a result, the edges appear somewhat concave (inward toward the interior of the fixture). In an example where the vertices 13a to 13d may be coplanar, the planes of the two-dimensional edge curves also are slanted inward relative to the two-dimensional plane containing the four vertices 13a to 13d as the planes of the edge curves extend away from the illustrated view and away from the plane containing the vertices 13a to 13d. Alternatively, the planes of the two-dimensional edge curves could extend somewhat outward away from the axis as they extend away from the plane containing the vertices 13a to 13d. In such an arrangement, the diffuser edges would appear convex in a plan view like that of FIG. 1. In another alternative approach, also applicable in later examples shown in FIGS. 2-13, each two-dimensional plane curve edge of the perimeter of the diffuser lies in a plane parallel to the central axis of the diffuser and perpendicular to the plane of the vertices of the diffuser. In this further alternative approach, the diffuser edges would appear as straight lines in a plan view like that of FIG. 1, and the diffuser otherwise like 10 would appear as a square in such a view since the distances between the vertices 13a to 13d along the sides are equal in the example.

The three-dimensional compound curvature of the diffuser 11 in the example fixture 10 approximately corresponds in shape to a portion of a sphere. The curvature may correspond to a portion of one of a variety of other types of curved shapes, such as an ovoid, ellipsoid, paraboloid or an oblate spheroid. The portion of a sphere is somewhat easier to work with in design, explanation, illustration and possibly some manufacturing techniques; therefore further discussions and illustrations of examples will use portions of a sphere as examples of three-dimensional compound curvatures unless expressly stated otherwise, although other shapes may be used as noted above.

In the first illustrated example, the light fixture 10 includes a housing 17. The example of FIGS. 1A and 1B shows a housing 17 with flat slanted sidewalls and a flat central back panel. Other examples described later use other housing shapes, many of which have three-dimensional compound curvatures.

The light fixture 10 includes a light source 19 in the housing 17. The two circles in FIG. 1A are intended to generally illustrate the source 19, for example as two lamps or lightbulbs (e.g. incandescent, compact fluorescent or halide lamps) or to represent circular cross-sections of a circular tubular lamp (e.g. of a fluorescent or neon lamp). The emitter or emitters forming the light source 19 may be any suitable type light emitting device. In many examples discussed in more detail later, the emitters are solid state light emitters, just a few examples of which includes electro luminescent (EL) devices, various types of light emitting diodes (LEDs), organic light emitting diodes (OLEDs), planar light emitting diodes (PLEDs) and laser diodes.

The type and number of emitters for the source 19 in a particular light fixture 10 are chosen to provide an intensity level of output light suitable for an intended general illumination type artificial lighting application of the particular fixture 10, e.g. to provide a specified number of lumens output at the light output surface of the diffuser 11 and/or a particular number of lumens or foot-candles at a specified distance from the light fixture 10 (e.g. corresponding to the intended mounting height of the fixture above a floor or work surface). In this way, the light fixture 10 may produce general illumination satisfying governmental and/or industry (e.g., IES, ANSI or the like) standards for an artificial lighting application of a luminaire. General illumination is the output of light or presence of light in a location acceptable for a general application of lighting according to one or more of the above mentioned standards. Examples of a general illumination application of lighting include task lighting or other downlighting for an office space or a work area. In addition or alternatively, the performance of the light fixture 10 may satisfy or exceed currently existing performance standards, such as Leadership in Energy & Environmental Design (LEED) interior lighting-quality standard, other governmental standards, other industry standards, or the like.

As noted earlier, the light fixture 10 includes a diffuser 11. The diffuser 11 is supported by the housing 17, at a distance from the source 19, so as to receive light from the source 19 and diffuse the light for illumination in an open ceiling space or a portion of a large space in which the light fixture provides general artificial lighting. A variety of techniques may be used to mount or attach the diffuser to the housing. For example, if the diffuser and sidewalls are to be translucent for a particular application, they may be formed as an integral unit by three-dimensional printing, extrusion or injection molding of a suitable material. In such a case, the back panel would be attached to the sidewalls to complete the housing.

In other examples, the back panel and sidewalls may be formed as an integral unit by three-dimensional printing, extrusion or injection molding of a suitable material(s) which provides a white reflective surface area, or the integral unit may be formed of a non-reflective substrate material which is then painted, powder coated or otherwise covered where appropriate with a white or specular reflective material. With the integral housing, the diffuser would be attached at or near the front edges of the housing sidewalls.

In other examples, the sidewalls may have two grooves at appropriate locations, such that the back panel fits into and is held by one set of grooves along the sidewalls, and the diffuser fits into and is held by the other set of grooves along the sidewalls. As an alternative to the use of grooves, particularly for the diffuser, there could be a ledge that the diffuser rests on and clips or fasteners to pin the diffuser in place.

In the examples, including the example of FIGS. 1, 1A and 1B, the diffuser is a relatively thin curved optical element having roughly parallel input and output surfaces of almost the same radius of curvature. The output surface of the diffuser 11 in the example also is the output surface of the light fixture 10, although other fixture arrangements may include another optical element providing the final output surface of the light fixture 10. The illustrated configuration of the diffuser, having roughly parallel input and output surfaces of almost the same radius of compound curvature, is the most common example; but other configurations may be used. For example, the output surface of the diffuser may have a different curvature, e.g. have a different radius, than the input surface of the diffuser. As another example, there may be an additional element on the output side of the diffuser, e.g. a clear panel or a grating, which provides the compound curved output surface of the light fixture and may have a different radius of curvature than the diffuser 11.

In the examples, including the example of FIGS. 1, 1A and 1B, the light source 19 is optically behind the diffuser 11. It should be appreciated that the source 19 may be located elsewhere and coupled to the diffuser by other elements not shown. For example, the lamps or solid state emitters of a particular source may be remote and the light supplied from the source to the housing and/or the diffuser via optical fibers. In another example (not shown), the fixture might include a light waveguide (sometimes referred to as a "light guide") behind the diffuser 11, in which case the lamp(s) or solid state emitters of the source 19 might be located along one or more edges of the perimeter of the housing 17 to input light to one or more edges of the waveguide. In such an edge-lit waveguide arrangement, the output surface of the waveguide may have a three-dimensional compound curvature similar to or the same as the three-dimensional compound curvature of the diffuser 11. For example, the waveguide could have the three-dimensional compound curvature and the diffuser could be formed by roughening of, or adding a suitable coating or film on, or molding, forming or adhering optical features onto the output surface of, or the back of, the waveguide. As another example, there may be an additional element on the output side of the waveguide, e.g. a clear panel or a grating, which provides the compound curved output surface of the light fixture and may have a different radius of curvature than the output surface of the waveguide.

At least one interior surface of the housing 17, for example, a portion or all of the interior surface(s) on one or more of the back panel or the slanted sidewalls, may be reflective. In some examples, all portions of all interior walls located so as to be able to reflect light from the source 19 toward the diffuser 11 are highly reflective. The high reflectivity helps to get the light out of the fixture and thereby helps with efficiency. The reflective surface(s) may be specular; although in many of the examples, the reflective surface(s) are highly diffusely reflective (e.g. formed of a 'bright white' material or coating). A white diffuser often is also somewhat diffusely reflective. In such a case, the diffusely reflective interior surface(s) of the housing 17 together with the diffuse reflectivity of the diffuser 11 form an optical integrating volume, chamber or cavity.

In the example light fixture 10 as well as in other light fixture examples discussed later, the fixture may provide some light output in a different direction from (and in addition to) the light output through the diffuser 11. For example, some or all of the housing 17 may be translucent to allow some of the light from the source 19 to emerge through the back panel or one or more of sidewalls. As another example, the back panel or any sidewall may have optical apertures to allow light output. As another alternative for supplying illumination in a direction other than through the diffuser 11, one or more additional light emitters may be mounted on the exterior of the housing 17 and aimed in one or more directions different from (and in addition to) the light output through the diffuser 11.

In the example light fixture 10 as well as in other light fixture examples discussed later, the outside of the housing 17 may have any desirable finish suitable to any particular lighting application. For example, for some applications it may be preferable for the exterior to appear relatively white. For other applications, such as a high ceiling application with the fixture mounted a substantial distance below the ceiling and where higher areas above the fixture and at or approaching the ceiling may be relatively dark, it may be preferable for the exterior of the fixture housing 17 to be black. Other exterior finishes may be used, such as grey, aluminum or brushed nickel.

The example light fixture 10 included four vertices 13a to 13d for the diffuser 11. The adjacent ones of the vertices 13a to 13d in the example are equidistant from each other. Although the angles could differ, in the example, if straight lines were drawn from each vertex to the next around the four sided perimeter, then angles at the vertices would all be 90° angles. Stated another way, the vertices may be corners of a square (e.g. a virtual square not shown). In some configurations where the planes of the curved edges 15a to 15d are perpendicular to the plane of the four vertices 13a to 13d, the diffuser in a two-dimensional view like FIG. 1 from a perspective along a central axis of the diffuser would appear approximately in the shape of a square.

In an implementation such as fixture 10 with four equidistant vertices 13a to 13d, for example for large format applications in large spaces, each dimension may be a length of approximately 24 inches (e.g. for a 2×2 foot fixture replacement application), although larger examples of such fixtures are at least approximately 32 inches. Specific examples of products in which the diffuser in a two-dimensional view like FIG. 1 from a perspective along a central axis of the diffuser would appear approximately in the shape of a square may have dimensions of 40 inches or 52 inches or larger.

The light fixtures under consideration here may have other shapes, for example, with different numbers of edges and vertices and different apparent shapes in the plan view toward the diffuser. The additional examples also have a housing in which the back panel also has a three-dimensional compound curvature. In such an example, the overall luminaire has compound curvature and may use the curved back panel to support emitters so as to form a curved surface light engine with an offset between the light engine and the curved light emitting surface at the diffuser. It may be helpful next to consider some of those additional examples in more detail.

FIG. 2 is an isometric view of another example 20 of a light fixture. FIG. 3A is a front view, FIGS. 3B and 3C are opposite side views, and FIGS. 3D and 3E are opposite end views of the example light fixture 20. FIG. 4 is a partial isometric view of the light fixture 20, with a sidewall removed to show some of the interior of the fixture 20; and FIG. 5 is an isometric view of the light fixture 20, with the diffuser removed to show some of the interior of the fixture including LED type solid state light emitters (e.g. LEDs) mounted at locations across an interior surface of a back panel of the housing of the fixture 20. As outlined with regard to the earlier fixture example, the LEDs may be white LEDs of one or more color characteristics or some of the LEDs may emit light of different color characteristics. It should also be appreciated that LEDs are discussed here by way of example, and light sources using one or more types of other emitters may be used in place of or in combination with the LEDs.

The light fixture 20 includes a diffuser 21 and a housing 27. The housing 27 has three or more sidewalls, in this example, four sidewalls 27a to 27d. The housing 27 also includes a back panel 28 (see e.g. FIGS. 3B to 3E). The sidewalls 27a to 27d may be joined together in a variety of ways. The diffuser 21 and housing back panel 28 may be attached to the sidewalls 27a to 27d in variety of ways, some of which were discussed with regard to the example of FIGS. 1, 1A and 1B, although a specific approach is described below with regard to FIG. 4.

As shown in the plan view toward the diffuser 21 in FIG. 3A, from a perspective along a central axis of the diffuser 21 toward the diffuser face of the light fixture 20, the sidewalls 27a to 27d appear approximately in the shape of a non-square rectangle. Although adjacent ones of the sidewalls 27a to 27d are at approximately 90° angles relative to each other, the actual corners 23a to 23d are somewhat rounded as shown by way of example in FIG. 3A. Although not readily visible in the assembled views of the light fixture 20, the diffuser 21 and the back panel 28 may have somewhat rounded corners or fillets at the vertices of the respective perimeters of the diffuser 21 and the back panel 28, so as to fit into the rounded corners of the housing sidewalls 27a to 27d. Fixtures similar to the light fixtures of FIGS. 2 to 5, however, need not have rounded corners or vertices.

As in the example of FIGS. 1, 1A and 1B, at least one interior surface on the back panel or the sidewalls is highly reflective. If also diffusely reflective, the interior reflective surface(s) together with the partially reflective diffuser 21 may form an optical integrating chamber, cavity or volume. As shown in FIGS. 4 and 5, the diffuser 21 is supported by the sidewalls of the housing opposite and at a distance from an interior surface 28i of the back panel 28; and at least the interior surface 28i of the back panel 28 is white, with a highly reflective diffuse finish.

The light source, in this example, includes a number of LEDs mounted at locations across the interior surface 28i of the back panel 28 of the housing to emit light for passage through the diffuser 21 (see FIGS. 4 and 5). Much like the diffuser in the example of FIGS. 1, 1A and 1B, the diffuser 21 in the light fixture 20 has a three-dimensional compound curvature. Also, the perimeter of the curved diffuser 21 has four edges connected at four vertices. The vertices may have somewhat curved fillets or the like connecting the actual curved edges of the perimeter of the diffuser 21. Each of the four edges of the perimeter of the diffuser 21 is a two dimensional plane curve, and the four edges are not coplanar with each other. In the example fixture 20 of FIGS. 2 to 5, the back panel 28 of the housing 27 is curved in a manner similar to the curved diffuser 21. More specifically, the back panel 28 that supports the LEDs 29 has a three-dimensional compound curvature. Also, the perimeter of the curved back panel 28 has four edges connected at four vertices. The vertices of the back panel may have somewhat curved fillets or the like connecting the actual curved edges of the perimeter of the back panel 28. Each of the four edges of the perimeter of the back panel 28 is a two dimensional plane curve, and those four edges are not all coplanar with each other.

In the example of FIGS. 2 to 5, the vertices of the perimeter of the back panel 28 are all coplanar with one another. Also in that example, the vertices of the perimeter of the diffuser 21 are all coplanar with one another. Although the curved edges may lie in other planes, as discussed above relative to the example of FIGS. 1, 1A and 1B, in the example fixture 20, each two-dimensional plane curve edge of the perimeter of the back panel lies in a plane parallel to the central axis of the back panel and the diffuser, and each two-dimensional plane curve edge of the diffuser lies in a plane parallel to the central axis of the back panel and the diffuser. Also, in light fixture 20 where the vertices of the diffuser are coplanar and the vertices of the back panel are coplanar, the plane of each two-dimensional plane curve edge of the perimeter of the back panel is perpendicular to the plane of the vertices of the back panel; and the plane of each two-dimensional plane curve edge of the perimeter of the diffuser lies in a plane perpendicular to the plane of the vertices of the diffuser. As a result of the orientations of the planes of the curved edges, although the perimeter edges of the diffuser 21 and the back panel 28 vary in other planar dimensions, the perimeter edges of the diffuser 21 and the back panel 28 are straight when viewed toward the diffuser as in FIG. 3A, but the curved perimeter edges of each of the diffuser 21 and the back panel 28 extend out away from the plane of the respective vertices (back away from the plane of the two-dimensional view of FIG. 3A, compare FIG. 2 to FIG. 3A).

Depending on materials and possibly other factors, compound curvature may be achieved via a variety of methods, including by way of examples: thermoforming, vacuum forming, injection molding, drape forming, hydro forming, or assembly methods. One assembly method may involve closing a frame around a flat sheet material and forcing the sheet into compound curvature by securing the sheet edges with frame rails of two-dimensional curved geometry. The two-dimensional curved geometry of the assembled rails corresponds to the plane geometry of the respective edges of a compound curvature surface. Standard manufacturing tolerances associated with these methods may invoke slight deviations from theoretically perfect geometry of the compound curvature surface.

In the light fixture 20 of FIGS. 2 to 5, for example, the sidewalls 27a to 27d of the housing may follow the plane curve edges of the compound curvatures of the diffuser 21 and the plane curve edges of the compound curvature of the back panel 28 of the housing 27. At least one major surface of each sidewall, for example, the interior surface and/or the opposite exterior surface, lies in a plane parallel to the central axis of the back panel and the diffuser and perpendicular to the plane of the vertices of the diffuser and/or the plane of the vertices of the back panel. In the example, the edges of the diffuser 21 are generally parallel to the edges of the back panel 28 along each side of the fixture 20. Each set of parallel edges of the diffuser and the back panel approximately lies in a common plane, and the corresponding sidewall 27a to 27d of the fixture housing 27 has one or more major surfaces (interior surface, opposite exterior surface or both) that lie in or are parallel to that same plane that includes the parallel edges of the diffuser 21 and the back panel 28. Housing panels exhibiting such planar sidewall surfaces allow for manufacturing components of the present geometry to be extruded and/or rolled. Generally all manufacturing methods are made easier via having a single flat or planar surface for each such sidewall housing component.

The sidewalls 27a to 27d of the housing 27 may be formed and/or assembled in a variety of ways of any suitable materials. For example, the sidewalls 27a to 27d may be rails of appropriate curves and dimensions formed of metal, plastic or the like joined by separate curved corner members, e.g. glued or welded to the rails forming the sidewalls 27a to 27d of the housing 27. If sidewalls were plastic, another attachment technique might be to sonic, weld the diffuser to the sidewalls. Other manufacturing approaches might involve casting or injection molding the sidewalls and back panel as one piece or casting or injection molding the sidewalls with the diffuser as one piece.

The diffuser 21 and the back panel 28 may be mounted in or attached to the sidewalls 27a to 27d of the housing 27 in any way that will provide sufficient strength and support for the fixture components, examples of which were discussed with regard to the example of FIGS. 1, 1A and 1B. In the example illustrated in FIGS. 2 to 5, each of the sidewalls 27a to 27d has two grooves corresponding to respective perimeter edges of the diffuser 21 and the back panel 28. Each of the corner joints between the sidewalls 27a to 27d also includes two grooves for respective curved fillets or the like at the vertices between plane curve edges of the diffuser 21 and plane curve edges of the back panel 28.

There are several ways to assemble the diffuser 21 and the back panel 28 with the sidewalls 27a to 27d. For example, three of the sidewalls would be assembled; then, the diffuser 21 and the back panel 28 are slid into the respective curved grooves; after which, the fourth sidewall is added to complete the fixture assembly. Another example technique might suspend the diffuser 21 and the back panel 28 in an appropriately shaped mold with curved diffusely reflective inserts in-between the diffuser 21 and the back panel 28 near the perimeter edges. Then, a suitable material is injected into the mold to form the sidewalls 27a to 27d around the edges of the diffuser 21 and the back panel 28 and to form substrates at the sidewalls for the diffusely reflective inserts.

Using these or other techniques, when the fixture 20 is fully assembled with the edges of the diffuser 21 and the back panel 28 in the grooves of the sidewalls and corner joints, the result is a fixture with compound curved front and back surfaces and flat sidewalls with two-dimensional curved edges (See FIG. 2).

As noted with respect to the example of FIGS. 2 to 5, each plane curved edge of the compound curved diffuser 21 lies in a plane parallel to the central axis of the back panel and the diffuser and each plane curved edge of the compound curved back panel lies in a plane parallel to the central axis of the back panel and the diffuser. The planes in which the edges of the diffuser lie may be essentially the same planes or parallel to the planes in which the edges of the back panel lie; and in such a cases, one or both major surfaces of the sidewalls lie in or are parallel to the planes of the respective diffuser and back panel edges.

It may be helpful to discuss the relationship of the planes to each other, the central axis, and the planes of the vertices of the diffuser and back panel, in somewhat more detail with reference to FIGS. 3F to 3J. For convenience, the illustrations in those geometrical line drawings assume a curvature (e.g. of the diffuser, the back panel or a surface of either the diffuser or the back panel) where the perimeter edges all have the same dimensions, e.g. length, radius of curve arc and circumference of the curved arc (as opposed to sides of the fixture 20 that differ in dimensions from the ends of the fixture 20).

Figure 3F:
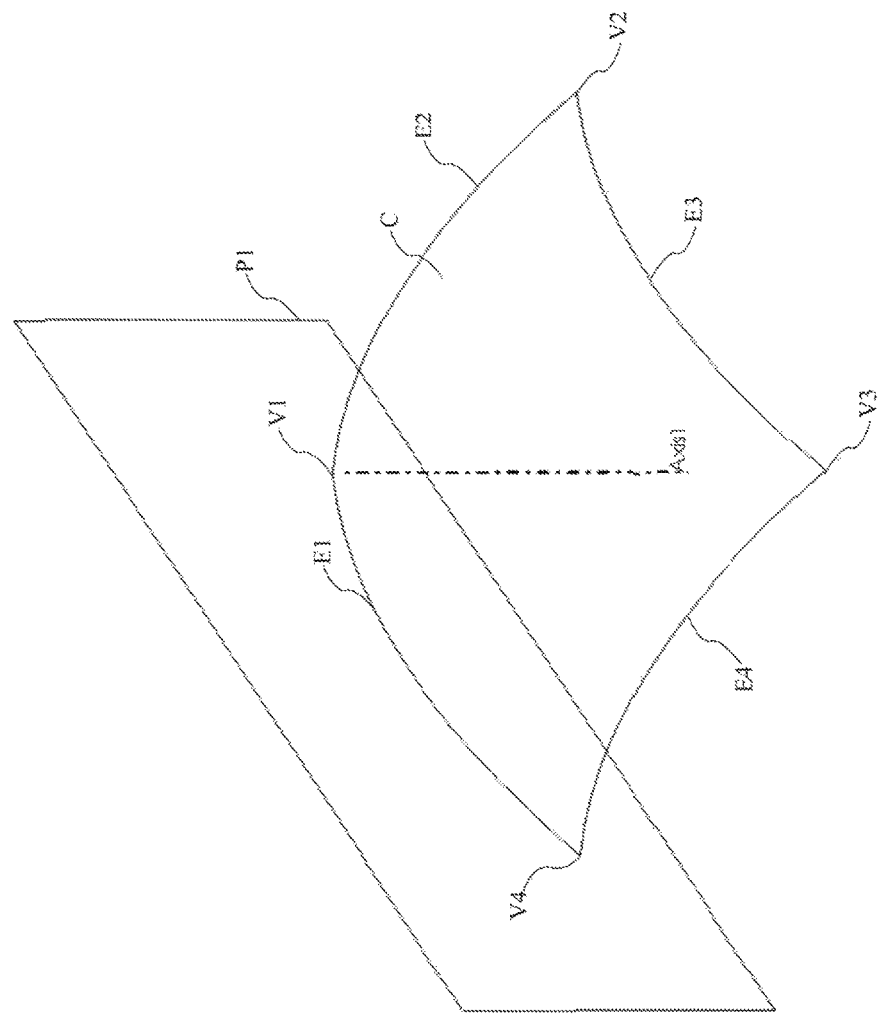
FIGS. 3F to 3J are line drawings of a part of a curvature and various planes in relationship to edges and vertices of the curvature, illustrating geometrical aspects of a light fixture like that of FIG. 2.

FIG. 3F shows a compound curvature C, for example, the compound curvature of the diffuser, the back panel, a surface of the diffuser or the back panel, or of some other optical element. The compound curvature C, and thus the back panel, the optical element or a surface thereof, has a perimeter having four edges E1 to E4 connected at four vertices V1 to V4. The central axis of the compound curvature C and thus of the optical element or surface thereof is shown at Axis1. Each edge E1 to E4 of the perimeter is a two dimensional plane curve.

Each plane curved edge E1 to E4 in the example lies in a plane parallel to the central axis Axis1. FIG. 3F also shows the plane P1 in which the plane curve edge E1 lies. As illustrated, the plane P1 of the curved edge E1 is parallel to the central axis Axis1. The plane of a surface of the corresponding sidewall, e.g. a sidewall like one of sidewalls 27a to 27d of light fixture 20, would be the same or parallel to the plane P1. For example, the interior surface of the corresponding sidewall may lie substantially in the plane P1 or may be slightly offset inward (e.g. if the edge E1 fits into a groove in the structure forming the sidewall). The exterior surface of the corresponding sidewall would be parallel to but somewhat offset outward from the plane P1 of the edge E1 based on the thickness of the structure used to form the sidewall.

Figure 3G:
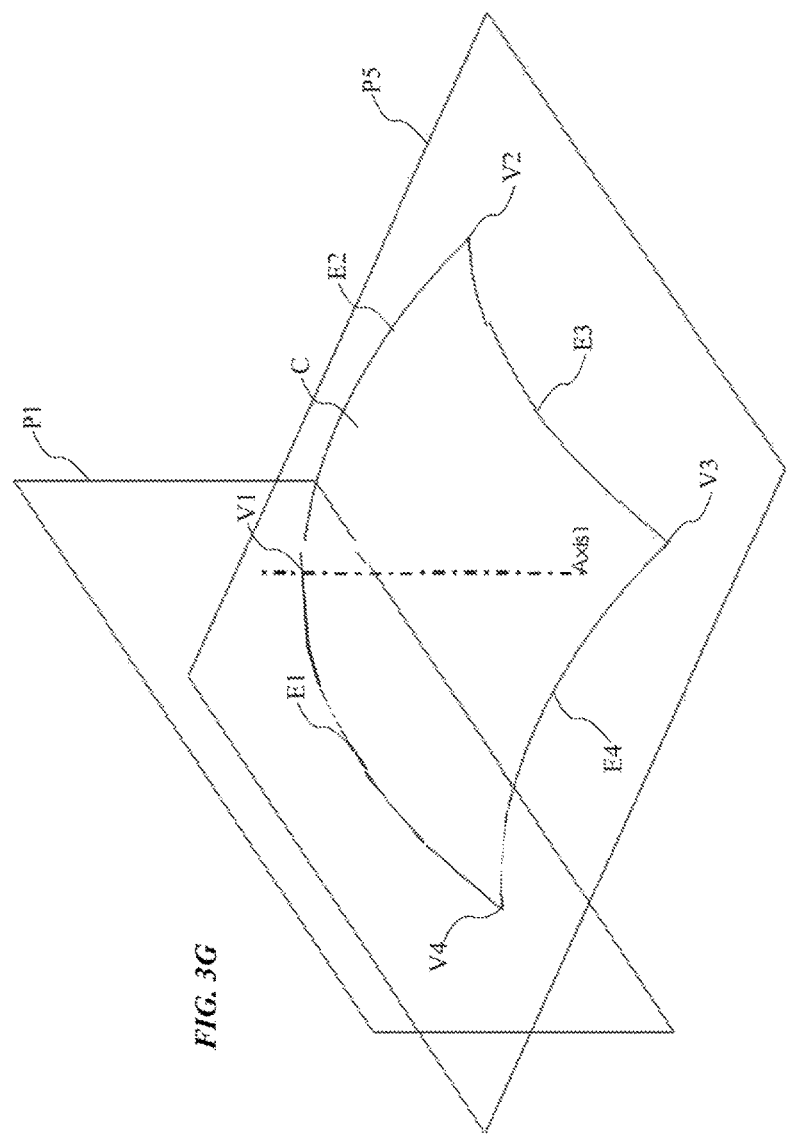

In the example, the vertices V1 to V4 all lie in one plane. FIG. 3G shows the plane of the vertices at P5. As shown, the two-dimensional plane curve edge E1 of the perimeter of compound curvature C of the particular optical element, surface or back panel lies in the plane P1 that is perpendicular to the plane P5 of the vertices V1 to V4 of the perimeter. Like the plane P1, the planes of the major surfaces (e.g. the interior surface and the opposite exterior surface) of the sidewall may be perpendicular to the plane P5 of the vertices V1 to V4.

Figure 3H:
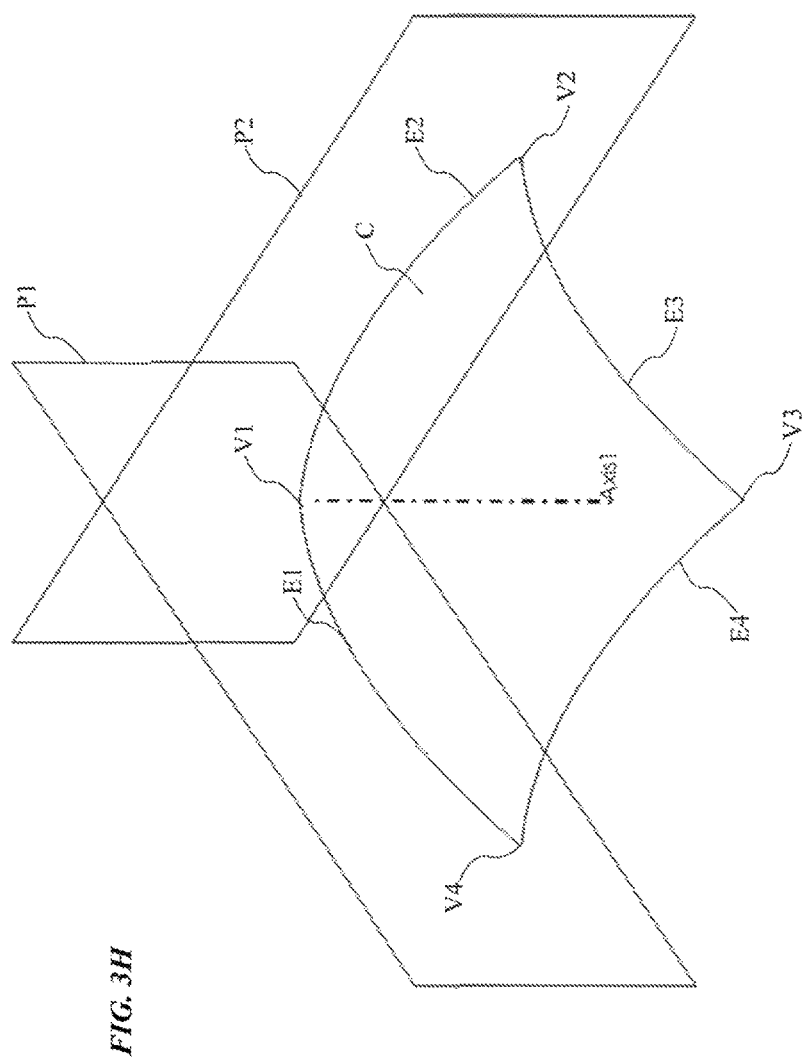

FIG. 3H is generally similar to FIG. 3F and includes similar reference characters for the corresponding elements. FIG. 3H also shows the plane P2 in which the plane curved edge E2 lies. As illustrated, the plane P2 of the curved edge E3 is parallel to the central axis Axis1. Although not separately shown in FIG. 3H, the two-dimensional plane curve edge E2 of the perimeter of compound curvature C of the particular optical element, surface or back panel lies in the plane P2 that also is perpendicular to the plane P5 of the vertices V1 to V4 of the perimeter (see also FIG. 3G). The plane of a surface of the sidewall corresponding to edge E2, e.g. a sidewall like one of sidewalls 27a to 27d of light fixture 20, would be the same or parallel to the plane P2. For example, the interior surface of the corresponding sidewall may lie substantially in the plane P2 or may be slightly offset inward (e.g. if the edge E2 fits into a groove the structure forming the sidewall). The opposite exterior surface of the corresponding sidewall would be parallel to but somewhat offset outward from the plane P2 of the edge E2 based on the thickness of the structure used to form the sidewall. Like the plane P2, the planes of the major surfaces (e.g. the interior and exterior surfaces) of the sidewall are perpendicular to the plane of the vertices V1 to V4.

Figure 3I:
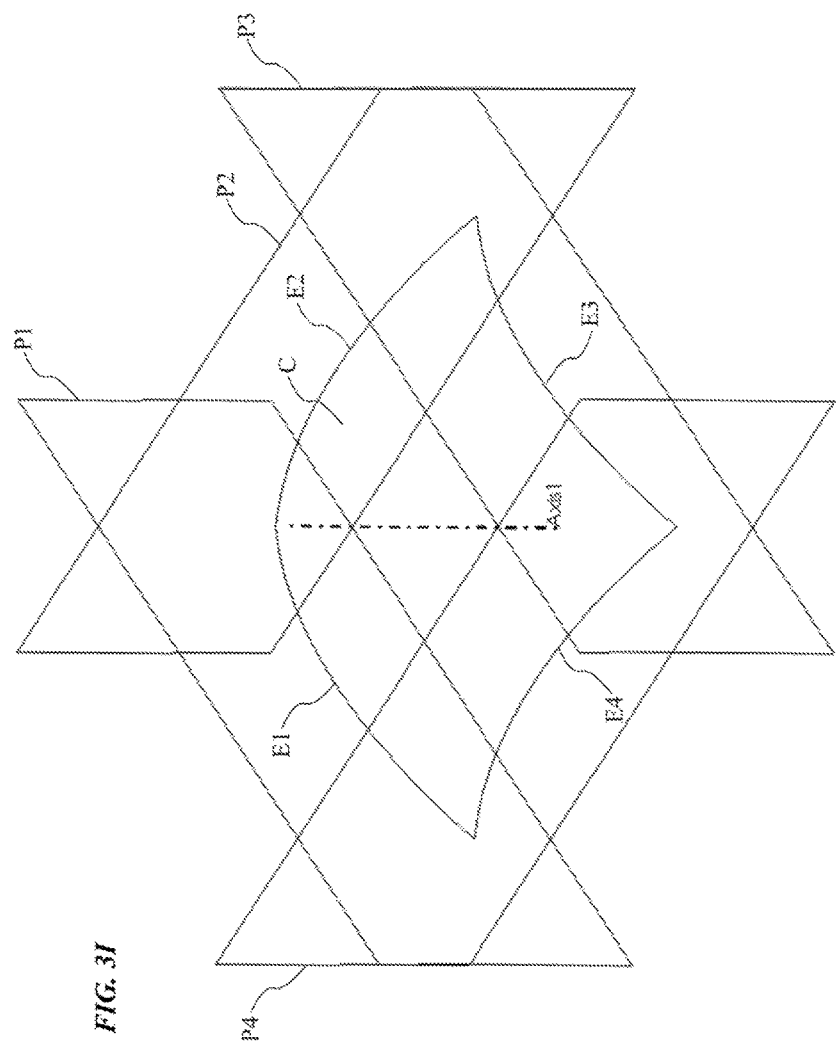

FIG. 3I shows is generally similar to FIG. 3H and some of the reference numbers are included in FIG. 3I to refer to the same elements, whereas other reference numbers from the earlier drawing are from FIG. 3I for convenience. Of note, FIG. 3I shows all four of the planes P1 to P4 in which the respective plane curve edges E1 to E4 of the perimeter of the object exhibiting the compound curvature C lie. The plane curved edge E3 lies in the plane P3, and that plane P3 is parallel to the central axis Axis1. The plane curved edge E4 lies in the plane P4, and that plane P4 is parallel to the central axis Axis1. Although not separately shown in FIG. 3I, the two-dimensional plane curve edges E3 and E4 of the perimeter of compound curvature C of the particular optical element, surface or back panel lie in the respective planes P3 and P4 that also are perpendicular to the plane P5 of the vertices V1 to V4 of the perimeter (see also FIG. 3G). The sidewalls along the edges E3 and E4 would be formed with planar surfaces in or parallel to the respective planes P3 and P4 similar to the sidewalls corresponding to the edges E1 and E2 discussed with regard to FIGS. 3F to 3H. The four planes P1 to P4 of the plane curve edges E1 to E4 also illustrate that at least those edges E1 to E4 of the perimeter of the component or surface thereof exhibiting the compound curve C are not coplanar with each other. One or more other edges not shown, such as fillets formed at the vertices, may be coplanar with one another or with one of the plane curve edges E1 to E4.

Figure 3J:
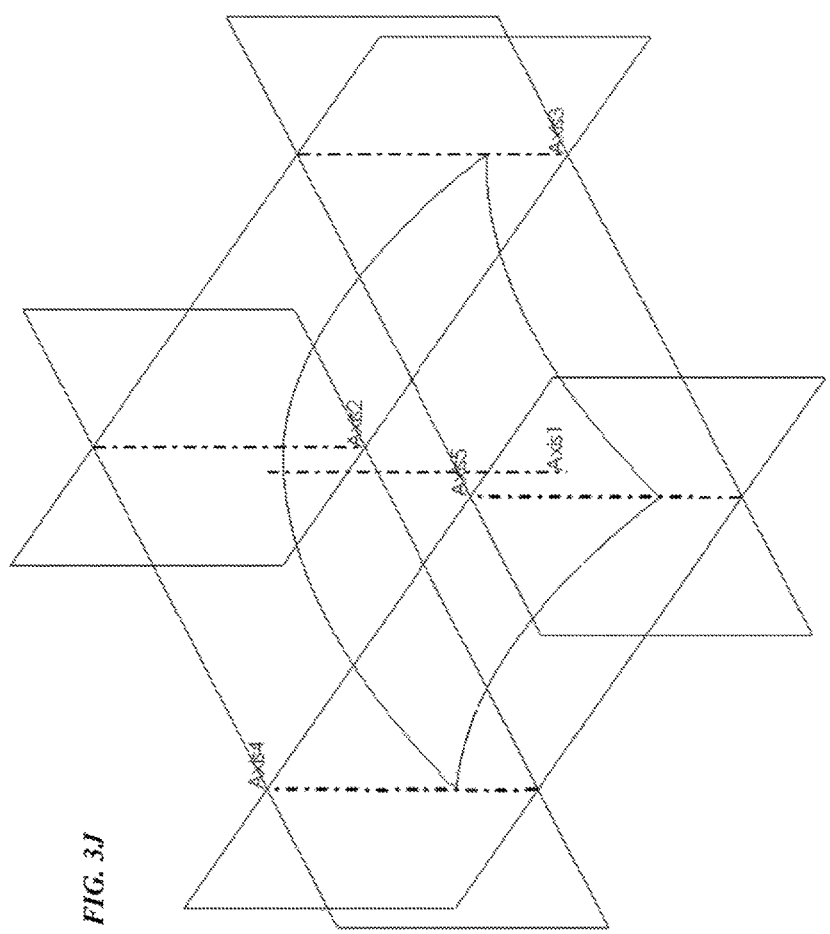

FIG. 3J is generally similar to FIG. 3I (and reference characters from the earlier drawings are omitted for ease of illustration). FIG. 3J, however, shows that axes Axi2 to Axis5 are formed at the intersections of the planes P1 to P4 (see FIG. 3J) and pass through the corresponding vertices V1 to V4 (see FIG. 3H) of the perimeter of the light fixture component or surface having the compound curvature C.

The compound curvature with plane curve edges forming the perimeter as shown in FIGS. 3F to 3I represents a concave example of such a curvature. Similar parallel and perpendicular relationships may be used, however, in later examples of fixtures having convex compound curvatures of optical elements, or housing panels or surfaces thereof. Also, although the example of FIGS. 3F to 3I apply to a shape having four edges, similar principles apply to light fixture elements having compound curvatures but with perimeters having three such plane curve edges or having five or more such plane curve edges.

As noted earlier, the compound curvatures may correspond to a variety of three dimensional shapes. In the examples of FIGS. 2 to 5, each three-dimensional compound curvature approximately corresponds in shape to a portion of a sphere. The partial spherical compound curvature of the back panel 28 has the same radius as the partially spherical compound curvature of the diffuser 21, and those two curved components 21, 28 of the fixture 20 are offset and do not share the same radial center point (see e.g. FIG. 4). Examples of light fixture 20 may be 3.25 or 4.25 inches thick. The interior surface 28i with the LEDs thus forms a light engine with a generally compound curvature providing a partial spherical light emitting surface offset from the partial spherical diffuser 21 and its light output surface. As outlined earlier, depending on materials and possibly other factors, compound curvature of the diffuser 21 and/or the back panel 28 may be achieved via a variety of methods, including by way of examples: thermoforming, vacuum forming, injection molding, drape forming, hydro forming, or assembly methods. One assembly method may involve closing a frame around a flat sheet material represented by the sidewalls 27a to 27d and forcing the sheet of the diffuser 21 and/or the sheet of the back panel 28 into a compound curvature like curvature C in FIGS. 3F to 3J by securing the sheet edges with frame rails of two-dimensional curved geometry. The two-dimensional curved geometry of the assembled rails are that of the respective edges of a compound curvature surface, such as the geometry of edges E1 to E4 for a curved diffuser 21 or for a curved back panel 28. Standard manufacturing tolerances associated with these methods may invoke slight deviations from theoretically perfect geometry of the compound curvature.

In this example, there are four vertices of the perimeter of the back panel 28 and there are four vertices of the perimeter of the diffuser 21. Each of the back panel 28 and the diffuser 21 in turn have four side edges around the respective perimeters of the back panel 28 and diffuser 21 (enclosed by the sidewalls 27a to 27d). In view of the perpendicular planes of the two-dimensional curved edges of the back panel 28, diffuser 21 and the sidewalls 27a to 27d, the fixture appears approximately rectangular (FIG. 2) in a two-dimensional view from a perspective along a central axis of the back panel and the diffuser. If shown separately, the diffuser 21 and the back panel 28 also would appear approximately rectangular (like the fixture of FIG. 2) in a two-dimensional view from a perspective along a central axis of the back panel and the diffuser.

A similar structure, with four vertices, sides and/or corner and sidewalls may be adapted to other apparent shapes. The fixture, diffuser and back panel may be configured to appear approximately in the shape of a trapezoid, a rhombus, a square or a non-square rectangle (ala FIGS. 2 to 5), in a two-dimensional view from a perspective along a central axis of the back panel and the diffuser.

Example light fixtures for open ceiling applications, large space applications or the like may have a minimum of at least approximately 32 inches. For a fixture having one dimension longer than the other, such as the fixture 20 of FIGS. 2-5 (or the fixture 40 discussed later with regard to FIGS. 8 to 11), the longer dimension may be at least approximately 48 inches. It may be desirable for the longer dimension to be approximately 1.6 times the shorter dimension, and since the shorter dimension is approximately at least 32 inches, the longer dimension in a fixture exhibiting the 1.6 ratio would be approximately 51.2 inches.

A medium sized fixture, for example, may have a base dimension of approximately 40 inches. A large sized fixture might have a base dimension of approximately 52 inches. For a square shaped fixture, both dimensions would be the same. For a non-equilateral triangle shaped fixture (shown and described later), or a non-square rectangular fixture, the longer dimension would be approximately 1.6 times the base dimension. The long dimension of the medium size fixture would be approximately 67 inches, and the long dimension of the large fixture would be approximately 83.2 inches.

A particularly appealing design ratio, is the Golden ratio 1.618 of long dimension to short dimension.

As noted earlier, a light fixture of a type under consideration here may have compound curvatures corresponding to various three-dimensional curved shapes, such as an ovoid, ellipsoid, paraboloid or oblate spheroid. Each of the curvatures of the example of FIGS. 2 to 5, for the diffuser 21 and the back panel 28, however, correspond to a portion of a sphere. For such fixtures where the curvature(s) correspond to a portion of a sphere, the curvatures of the medium sized fixture component(s) may have a radius of approximately 96 inches, and the curvature(s) of the large sized fixture component(s) may have a radius of approximately 124.8 inches.

The examples shown have the same radius of curvature for the compound curvature of the diffuser 21 and the back panel 28, but the central points of the two curvatures are offset from one another, e.g. by an amount corresponding to the separation distance between the diffuser 21 and the back panel 28. Other arrangements are possible. For example, the three-dimensional compound curvature of the back panel 28 may approximately correspond to a portion of a sphere of a first radius, and the three-dimensional compound curvature of the diffuser may approximately correspond to a portion of a sphere of a second radius. In such an example (not shown) the second radius is different from the first radius.

In the light fixture 20 of FIGS. 2 to 5, the three-dimensional compound curvature of the diffuser 21 is concave with respect to direction of light output via the diffuser 21. Although the back panel 28 may be configured differently, in the illustrated example, the three-dimensional compound curvature of the back panel 28 also is concave with respect to direction of emission from the LEDs 29 on the surface 28i and the direction of light output from the fixture 20 through the diffuser 21.

Figure 6:
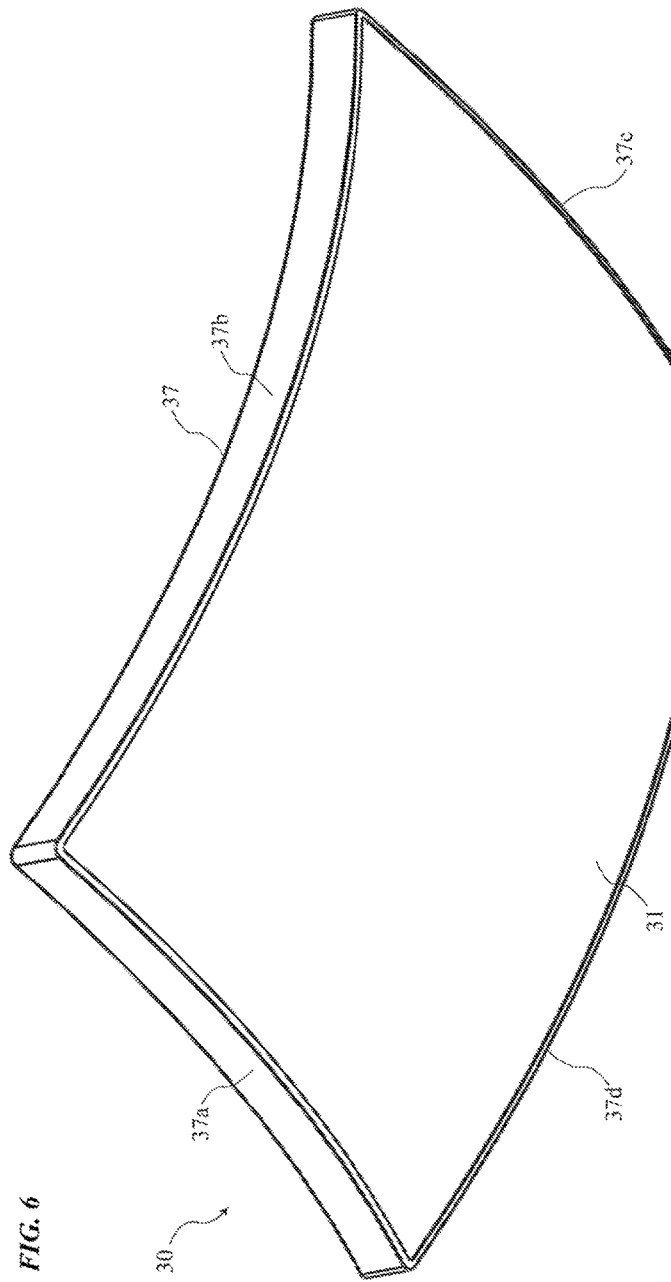
FIG. 6 is an isometric view of another example of a light fixture.
Figure 7:
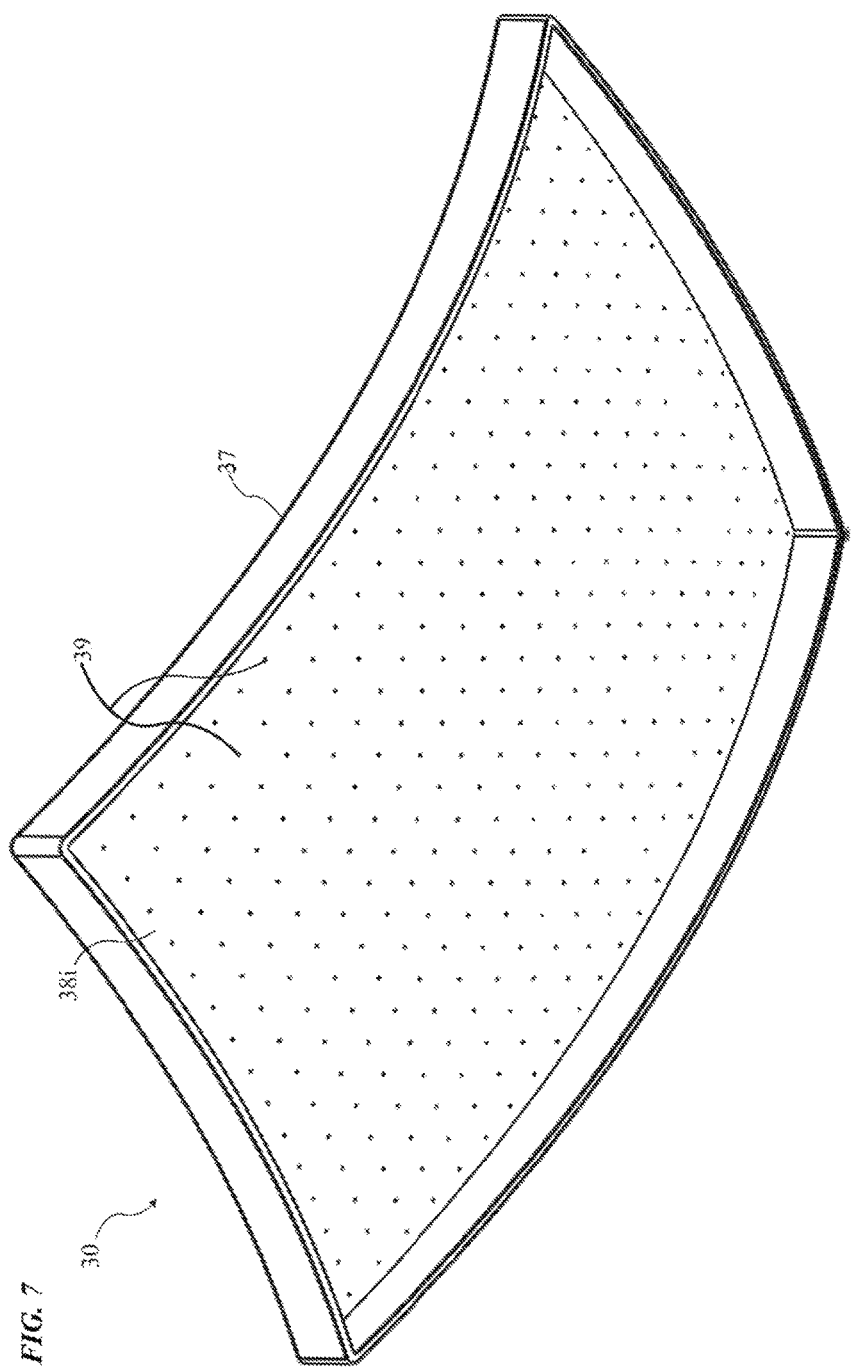
FIG. 7 is an isometric view of the light fixture of FIG. 6, with the diffuser removed to show some of the interior of the fixture including solid state light emitters mounted at locations on a back panel of the housing of the fixture.

Alternatively one or both of the three-dimensional compound curvatures of the diffuser or the back panel of a light fixture may be convex with respect to direction of light emission and output via the light fixture. It may be helpful to consider an example of a light fixture 30, as shown in FIGS. 6 and 7 with a convex three-dimensional compound curvature of the diffuser 31 with respect to direction of light output via the diffuser 31. FIG. 6 is an isometric view of the fixture 30, and FIG. 7 is an isometric view of the light fixture 30 with the diffuser removed to show some of the interior of the fixture including solid state light emitters mounted on a back panel of the housing of the fixture.

Except for using convex curvatures instead of concave curvatures, the structure, size, dimensions, assembly, materials and diffuse or reflective properties of the various components of the light fixture 30 are similar to those of the light fixture 20 described above with respect to the FIGS. 2 to 5.

The light fixture 30 includes a diffuser 31 and a housing 37. The housing 37 has three or more sidewalls, in this example, four sidewalls 37a to 37d. The housing 37 also includes a back panel, of which the interior surface 38i is visible in FIG. 7. The sidewalls 37a to 37d of the housing 37 may be similar to the sidewalls of the earlier light fixture 20 except that the sidewalls 37a to 37d are inverted to accept the convex diffuser 31 and back panel.

Much like the diffuser in the earlier examples, the diffuser 31 in the light fixture 30 has a three-dimensional compound curvature. Also, the perimeter of the curved diffuser 31 has four edges connected at four vertices. The vertices may have somewhat curved fillets or the like connecting the actual curved edges of the perimeter of the diffuser 31. Each of the four edges of the perimeter of the diffuser 31 is a two dimensional plane curve, and the four edges are not all coplanar with each other. The vertices of the perimeter of the diffuser 31 are all coplanar with one another. Each two-dimensional plane curve edge of the diffuser 31 lies in a plane parallel to the central axis of the back panel and the diffuser, and the plane of each two-dimensional plane curve edge of the diffuser 31 is perpendicular to the plane of the vertices of the diffuser.

In the example fixture 30 of FIGS. 6 and 7, the back panel of the housing 37 is curved in a manner similar to the curved diffuser 31. More specifically, the back panel that supports the LEDs 39 on surface 38i of the panel has a three-dimensional compound curvature. Also, the perimeter of the curved back panel has four edges connected at four vertices. The vertices of the back panel may have somewhat curved fillets or the like connecting the actual curved edges of the perimeter of the back panel. Each of the four edges of the perimeter of the back panel is a two dimensional plane curve, and those four edges are not all coplanar with each other. Also, the vertices of the perimeter of the back panel are all coplanar with one another. As in the illustrated example of the light fixture 20, each two-dimensional plane curve edge of the perimeter of the back panel in the fixture 30 lies in a plane parallel to the central axis of the back panel and the diffuser. Also, the plane of each two-dimensional plane curve edge of the perimeter of the back panel in the fixture 30 is perpendicular to the plane of the vertices of the back panel.

In the light fixture 30 of FIGS. 6 and 7, the three-dimensional compound curvature of the diffuser 31 is convex with respect to direction of light output via the diffuser 31. Although the back panel may be configured differently, in the illustrated example, the three-dimensional compound curvature of the back panel of light fixture 30 also is convex with respect to direction of emission from the LEDs 39 on the surface 28i and the direction of light output from the fixture 30 through the diffuser 31.

It should also be apparent that light fixtures similar to the example of FIGS. 2 to 5 can be manufactured with compound three-dimensionally curved components having larger numbers of vertices and sides. Some examples may be three-dimensionally compound curved components having only two plane curved edges and two vertices. Similar examples but where the diffuser and back panel have compound three-dimensional curvatures with three vertices and three sides are discussed below, with respect to FIGS. 8 to 13.

Figure 11:
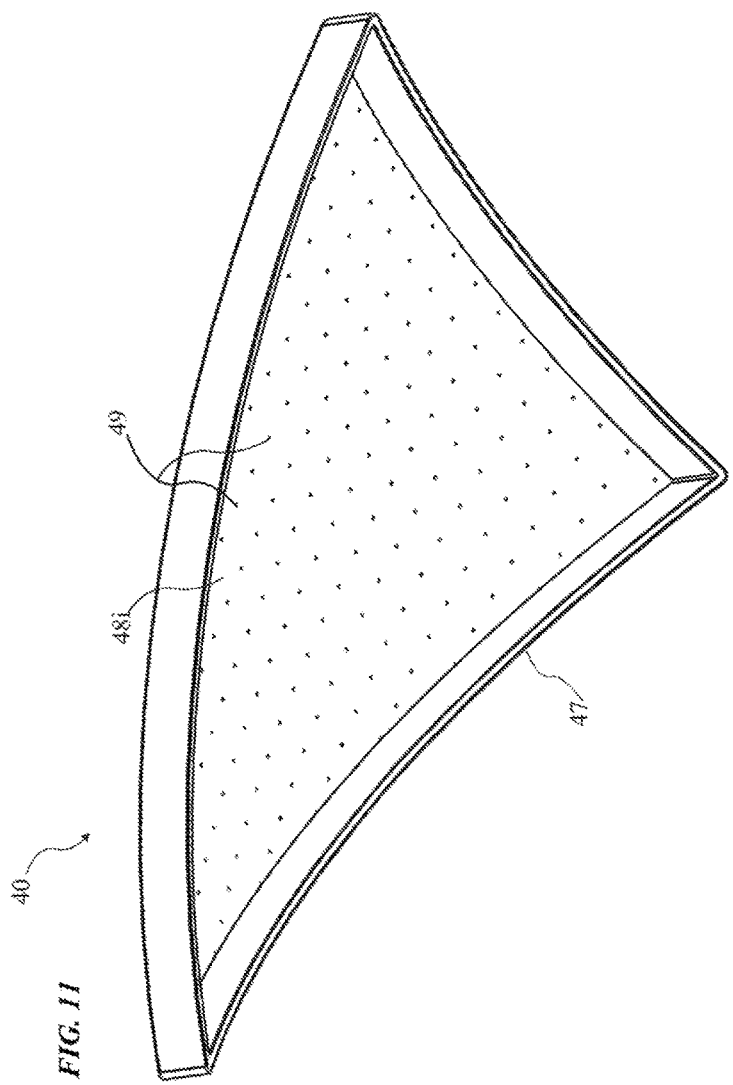
FIG. 11 is an isometric view of the light fixture of FIG. 8, with the diffuser removed to show some of the interior of the fixture including solid state light emitters mounted at locations on a back panel of the housing of the fixture.

FIG. 8 is an isometric view of a concave example of such a light fixture 40. FIG. 9A is a front view, FIGS. 9B and 9C are opposite side views, and FIGS. 9D and 9E are opposite end views of the light fixture 40. FIG. 10 is an isometric view of the light fixture 40, with one of the sidewalls of the housing removed to show some of the interior of the light fixture 40. FIG. 11 is an isometric view of the light fixture 40, with the diffuser removed to show some of the interior of the fixture including LED type solid state light emitters mounted at locations on a back panel of the housing of the light fixture 40.

The main difference from the example fixture 20 described above is that the light fixture 40 has three sides and three corners for the three edges and three vertices of the diffuser and for the three edges and three vertices of the back panel, whereas the earlier light fixture had four of each of these components/features. Otherwise, the structure, dimensional relationships, assembly, materials and reflective properties of the various components of the light fixture 40 are similar to those of the light fixture 20 described above with respect to the FIGS. 2 to 5.

It should also be appreciated that LEDs are discussed here by way of example, and light sources using one or more types of other emitters may be used in place of or in combination with the LEDs.

The light fixture 40 includes a diffuser 41 and a housing 47. The housing 47 has three sidewalls 47a to 47c. The housing 47 also includes a back panel 48 (see e.g. FIGS. 9B to 9E). The sidewalls 47a to 47c may be joined together in a variety of ways. The diffuser 41 and housing back panel 48 may be attached to the sidewalls 47a to 47c in variety of ways, such as those discussed above with regard to the earlier examples.

As shown in the plan view toward the diffuser 41 in FIG. 9A, from a perspective along a central axis of the diffuser 41 toward the diffuser face of the light fixture 40, the sidewalls 47a to 47a appear approximately in the shape of a triangle. In the particular example, the sidewalls 47a and 47c are the same length, but the sidewall 47b is shorter. Hence, in the actual illustrated example, in the perspective along the central axis of the diffuser 41 toward the diffuser face of the light fixture 40, the sidewalls 47a to 47a appear approximately in the shape of a non-equilateral isosceles triangle.

The actual corners 43a to 43c are somewhat rounded as shown by way of example in FIG. 9A. Although not readily visible in the assembled views of the light fixture 40, the diffuser 41 and the back panel 48 may have somewhat rounded corners or fillets at the vertices of the respective perimeters of the diffuser 41 and the back panel 48, so as to fit into the rounded corners of the housing sidewalls 47a to 47d.

As in the earlier examples, at least one interior surface on the back panel or the sidewalls is highly reflective. If also diffusely reflective, the interior reflective surface(s) together with the partially reflective diffuser 41 may form an optical integrating chamber, cavity or volume. As shown in FIGS. 10 and 11, the diffuser 41 is supported by the sidewalls of the housing opposite and at a distance from an interior surface 48*i* of the back panel 48; and at least the interior surface 48*i* of the back panel 48 is white, with a highly reflective diffuse finish.

The light source, in this example, includes a number of LEDs mounted at locations across the interior surface 48*i* of the back panel 48 of the housing to emit light for passage through the diffuser 41 (see FIGS. 10 and 11). Much like the diffusers in the earlier examples, the diffuser 41 in the light fixture 40 has a three-dimensional compound curvature.

The perimeter of the curved diffuser 41 has three edges connected at three vertices. The vertices may have somewhat curved fillets or the like connecting the actual curved edges of the perimeter of the diffuser 41. Each of the three edges of the perimeter of the diffuser 41 is a two dimensional plane curve, and the three edges are not all coplanar with each other. In the example fixture 40 of FIGS. 8 to 11, the back panel 48 of the housing 47 is curved in a manner similar to the curved diffuser 41. More specifically, the back panel 48 that supports the LEDs 49 has a three-dimensional compound curvature. Also, the perimeter of the curved back panel 48 has three edges connected at three vertices. The vertices of the back panel may have somewhat curved fillets or the like connecting the actual curved edges of the perimeter of the back panel 48. Each of the three edges of the perimeter of the back panel 48 is a two dimensional plane curve, and those three edges are not all coplanar with each other.

In the example of FIGS. 8 to 11, the vertices of the perimeter of the back panel 48 are all coplanar with one another. Also in that example, the vertices of the perimeter of the diffuser 41 are all coplanar with one another. Although the curved edges may lie in other planes, as discussed above relative to the earlier examples, in the example fixture 40, each two-dimensional plane curve edge of the perimeter of the back panel 48 lies in a plane parallel to the central axis of the back panel and the diffuser, and each two-dimensional plane curve edge of the diffuser 41 lies in a plane parallel to the central axis of the back panel and the diffuser. Also, in light fixture 40 where the vertices of the diffuser are coplanar and the vertices of the back panel are coplanar, the plane of each two-dimensional plane curve edge of the perimeter of the back panel is perpendicular to the plane of the vertices of the back panel; and the plane of each two-dimensional plane curve edge of the perimeter of the diffuser lies in a plane perpendicular to the plane of the vertices of the diffuser. As a result of the orientations of the planes of the curved edges, although the perimeter edges of the diffuser 41 and the back panel 48 vary in other planar dimensions, the perimeter edges of the diffuser 41 and the back panel 48 are straight when viewed toward the diffuser as in FIG. 9A, but the curved perimeter edges of each of the diffuser 41 and the back panel 48 extend out away from the plane of the respective vertices (back away from the plane of the two-dimensional view of FIG. 9A, compare FIG. 8 to FIG. 9A).

The sidewalls 47*a* to 47*c* of the housing 47 may be formed and/or assembled in a variety of ways of any suitable materials, examples of which have been described with regard to the earlier light fixture examples.

40 The diffuser 41 and the back panel 48 may be mounted in or attached to the sidewalls 47*a* to 47*d* of the housing 47 in any way that will provide sufficient strength and support for the fixture components, examples of which were discussed with regard to the example light fixture 20 of FIGS. 2 to 5. There are several ways to assemble the diffuser 41 and the back panel 48 with the sidewalls 47*a* to 47*d*, examples of which were discussed with regard to the example light fixture 20 of FIGS. 2 to 5. Using these or other techniques, when the fixture 40 is fully assembled with the edges of the diffuser 41 and the back panel 48 in the grooves of the sidewalls and corner joints, the result is a fixture with compound curved front and back surfaces and flat sideways with two-dimensional curved edges (See FIG. 8).

As noted earlier, the compound curvatures may correspond to a variety of three dimensional shapes. In the examples of FIGS. 8 to 11, each three-dimensional compound curvature approximately corresponds in shape to a portion of a sphere. The partial spherical compound curvature of the back panel 48 has the same radius as the partially spherical compound curvature of the diffuser 41, and those two curved components 41, 48 of the fixture 40 are offset and do not share the same radial center point (see e.g. FIG. 10). Examples of light fixture 40 may be 3.25 inches thick. The interior surface 48*i* with the LEDs thus forms a light engine with a compound curvature providing a partial spherical light emitting surface offset from the partial spherical diffuser 41 and its light output surface.

In this example, there are three vertices of the perimeter of the back panel 48 and there are three vertices of the perimeter of the diffuser 41. Each of the back panel 48 and the diffuser 41 in turn have three side edges around the respective perimeters of the back panel 48 and diffuser 41 (enclosed by the sidewalls 47*a* to 47*d*). In view of the perpendicular planes of the two-dimensional curved edges of the back panel 48, diffuser 41 and the sidewalls 47*a* to 47*d*, the fixture appears approximately triangular (FIG. 9A) in a two-dimensional view from a perspective along a central axis of the back panel and the diffuser. If shown separately, the diffuser 41 and the back panel 48 also would appear approximately rectangular (like the fixture of FIG. 9A) in a two-dimensional view from a perspective along the central axis of the back panel and the diffuser.

Example light fixtures for open ceiling or large space applications or the like may have short and long dimensions similar to those discussed above relative to the FIGS. 2 to 5. In a triangular fixture example, like light fixture 40, the dimensions are the length of the base and the height of the triangle from the base to the opposite vertex. Referring to FIG. 9A, the short dimension is the base dimension, which corresponds to length of sidewall 47*b*. The long dimension is the height dimension, which corresponds to the distance from the corner 43*a* to the sidewall 47*b* along a line perpendicular to the sidewall 47*b*. Again, the illustrated example assumes curvatures of a diffuser and a back panel of a fixture 40 correspond to a portion of a sphere, although the curvatures may correspond to other shapes.

The examples of the diffuser 41 and the back panel 48 shown in FIGS. 8 to 11 have the same radius of curvature for the respective compound curvatures of the diffuser 41 and the back panel 48. In the example light fixture 40, however, but the central points of the two curvatures are offset from one another, e.g. by an amount corresponding to the separation distance between the diffuser 41 and the back panel 48. Other arrangements are possible. For example, the three-dimensional compound curvature of the back panel 48 may approximately correspond to a portion of a sphere of a first radius, and the three-dimensional compound curvature of the diffuser 41 may approximately correspond to a portion of a sphere of a second radius. In such an example (not shown) the second radius is different from the first radius.

In the light fixture 40 of FIGS. 8 to 11, the three-dimensional compound curvature of the diffuser 41 is concave with respect to direction of light output via the diffuser 41. Although the back panel 48 may be configured differently, in the illustrated example, the three-dimensional compound curvature of the back panel 48 also is concave with respect to direction of emission from the LEDs 49 on the surface 48*i* and the direction of light output from the fixture 40 through the diffuser 41.

Figure 12:
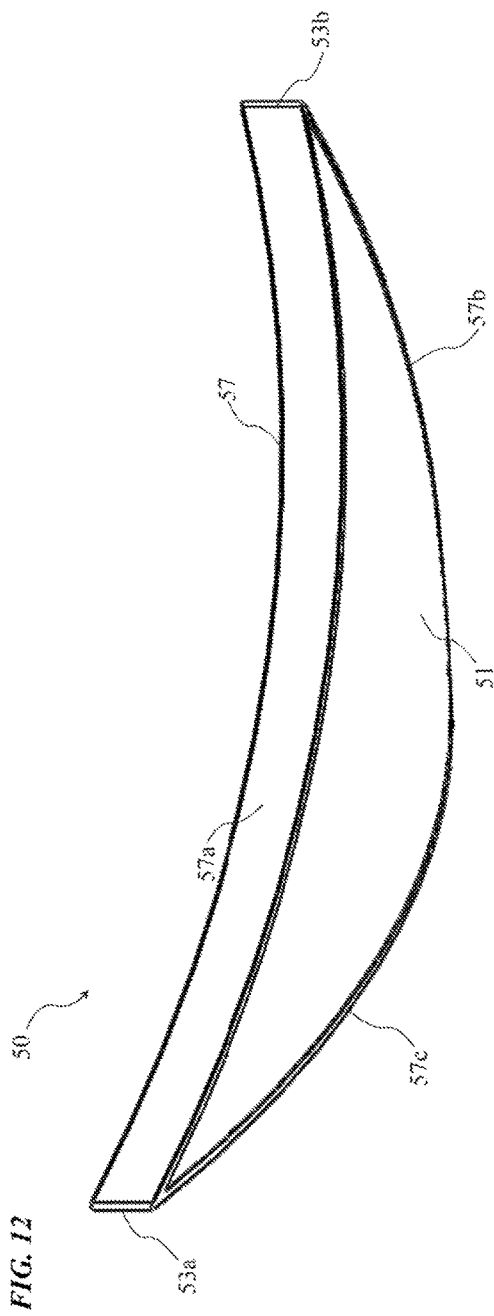
FIG. 12 is an isometric view of another example of a light fixture.
Figure 13:
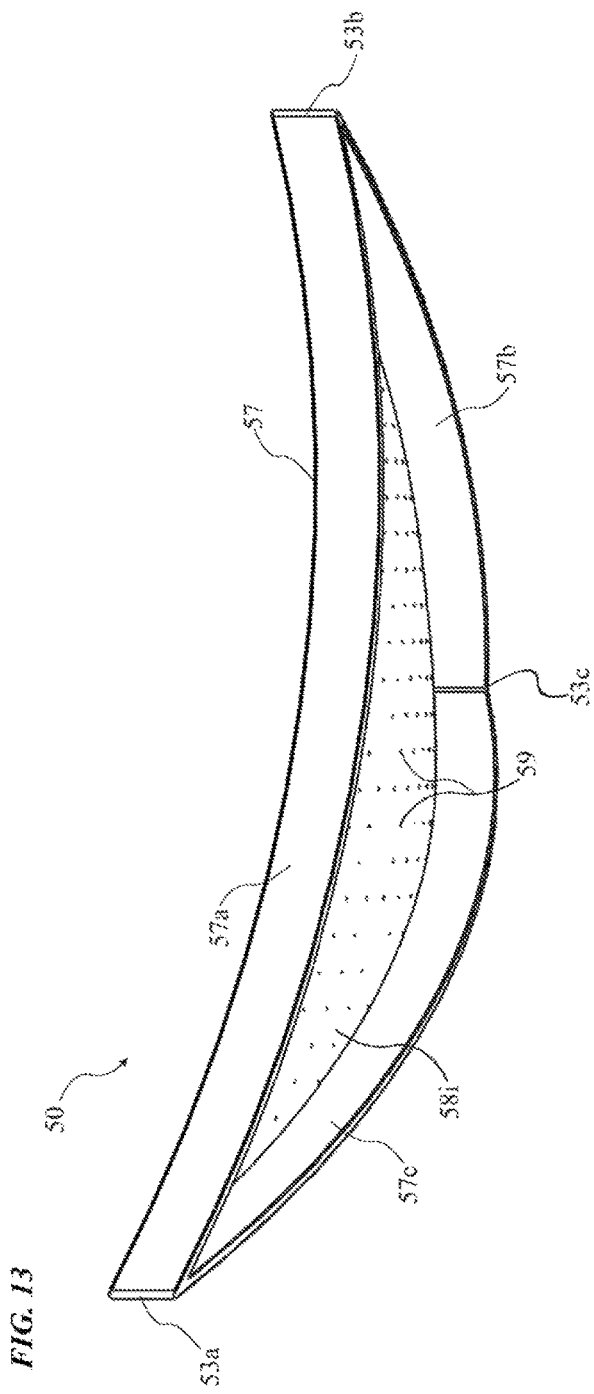
FIG. 13 is an isometric view of the light fixture of FIG. 12, with the diffuser removed to show some of the interior of the fixture including solid state light emitters mounted at locations on a back panel of the housing of the fixture.

Alternatively one or both of the three-dimensional compound curvatures of the diffuser or the back panel of a three-sided light fixture may be convex with respect to direction of light emission and output via the light fixture. It may be helpful to consider an example of a light fixture 50, as shown in FIGS. 12 and 13 with a convex three-dimensional compound curvature of the diffuser 51 with respect to direction of light output via the diffuser 51. FIG. 12 is an isometric view of the fixture 50, and FIG. 13 is an isometric view of the light fixture 50 with the diffuser removed to show some of the interior of the fixture including solid state light emitters mounted on a back panel of the housing of the fixture.

Except for using convex curvatures instead of concave curvatures, the structure, size, dimensions, assembly, materials and diffuse or reflective properties of the various components of the light fixture 50 are similar to those of the light fixture 40 described above with respect to the FIGS. 8 to 11.

The light fixture 50 includes a diffuser 51 and a housing 57. The housing 57 has three or more sidewalls, in this example, three sidewalls 57*a* to 57*c* and three corners 53*a* to 53*c*. The housing 57 also includes a back panel, of which the interior surface 58*i* is visible in FIG. 13. The sidewalls 57*a* to 57*c* and corners 53*a* to 53*c* of the housing 57 may be similar to the sidewalls and corners of the earlier light fixture 40 except that the sidewalls 57*a* to 57*c* are inverted to accept the convex diffuser 51 and back panel.

Much like the diffuser in the earlier examples, the diffuser 51 in the light fixture 50 has a three-dimensional compound curvature. Also, the perimeter of the curved diffuser 51 has three edges connected at three vertices. The vertices may have somewhat curved fillets or the like connecting the actual curved edges of the perimeter of the diffuser 51. Each of the three edges of the perimeter of the diffuser 51 is a two dimensional plane curve, and the three edges are not coplanar with each other. The vertices of the perimeter of the diffuser 51 are all coplanar with one another. Each two-dimensional plane curve edge of the diffuser 51 lies in a plane parallel to the central axis of the back panel and the diffuser, and the plane of each two-dimensional plane curve edge of the diffuser 51 is perpendicular to the plane of the vertices of the diffuser.

In the example fixture 50 of FIGS. 6 and 7, the back panel of the housing 57 is curved in a manner similar to the curved diffuser 51. More specifically, the back panel that supports the LEDs 59 on surface 58*i* of the panel has a three-dimensional compound curvature. Also, the perimeter of the curved back panel has three edges connected at three vertices. The vertices of the back panel may have somewhat curved fillets or the like connecting the actual curved edges of the perimeter of the back panel. Each of the three edges of the perimeter of the back panel is a two dimensional plane curve, and those three edges are not coplanar with each other. Also, the vertices of the perimeter of the back panel are all coplanar with one another. As in the illustrated example of the light fixture 40, each two-dimensional plane curve edge of the perimeter of the back panel in the fixture 50 lies in a plane parallel to the central axis of the back panel and the diffuser. Also, the plane of each two-dimensional plane curve edge of the perimeter of the back panel in the fixture 50 is perpendicular to the plane of the vertices of the back panel.

In the light fixture 50 of FIGS. 12 and 13, the three-dimensional compound curvature of the diffuser 51 is convex with respect to direction of light output via the diffuser 51. Although the back panel may be configured differently, in the illustrated example, the three-dimensional compound curvature of the back panel of light fixture 50 also is convex with respect to direction of emission from the LEDs 59 on the surface 28*i* and the direction of light output from the fixture 50 through the diffuser 51.

A light fixture constructed as discussed above relative to FIGS. 1 to 13 includes a controllable light source; and the description mentioned a variety of sources that the fixture may include, many of which are electronically controllable, e.g. solid state light emitters. Although relatively simple electronics may be used to drive such light sources; increasingly, lighting systems are equipped with sophisticated "intelligent" electronics that implement programmatic control and related function and/or support communications with other similar equipment or with higher level system control computers for example for building management from a central server or from a remote user terminal.

Figure 14:
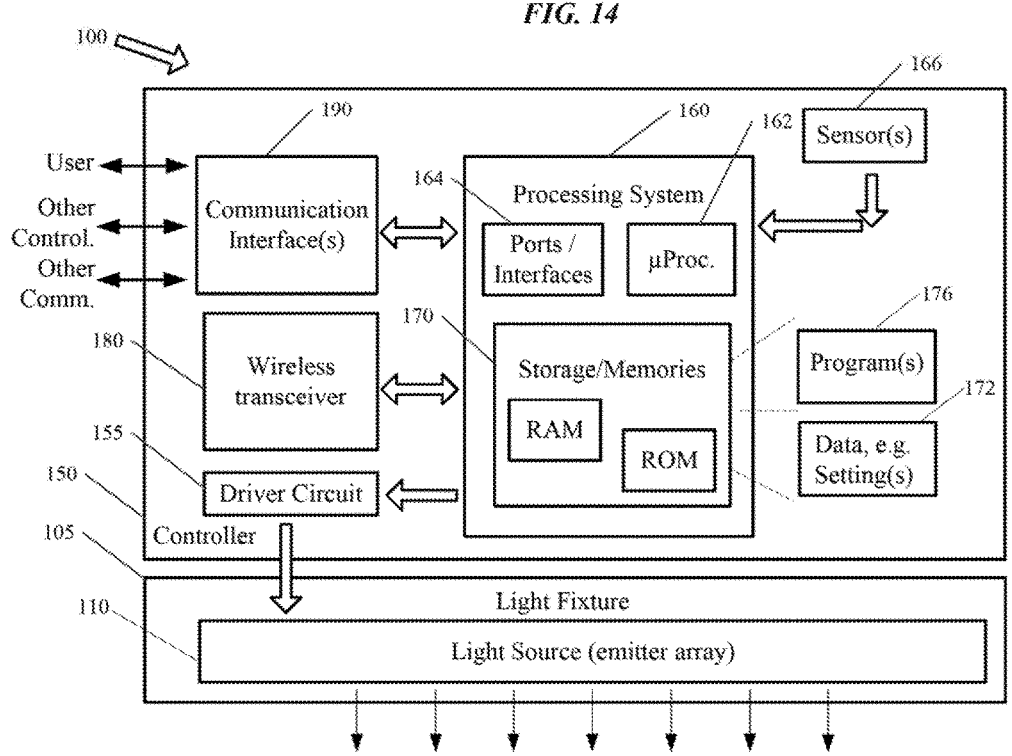
FIG. 14 is a high level functional block diagram of a lighting device, including a light fixture and associated driver, as well as communication and control electronics.

At this point, it may be helpful to consider a more detailed example of a lighting device or system combining a light fixture of the type described herein with an example arrangement of electronics providing such intelligent control and communications. FIG. 14 illustrates an example of such a lighting device 100, in high level block diagram form. As a general overview, lighting device 100 in the example includes a light fixture 105 having a light source 110, and includes a controller 150. Any of the earlier light fixture examples may be used as the light fixture 100. The light fixture 105 includes the light source 110, which in the example takes the form of an emitter matrix or array of light emitters, such as an array of LEDs as in several of the earlier fixture examples.

General illumination light output parameters of the light source 110, such as ON/OFF state, desired output intensity and the like may be controlled based on a control signal, time of day, a sensor signal, feedback from a cloud controller or the like. Depending on implementation details, the emitters of the array may be controlled as one group or several independently controllable groups, or each of the emitters may be individually controllable. Hence, depending on the type of light source, e.g. an array of particular types of LEDs, the device 100 may also be able to control overall color characteristic of the light output, may be able to individually control intensity and/or color characteristic at points of the array of the emitters, or may even be able to provide some image display capability.

A manufacturer may offer a lighting device 100 having a light fixture 105 in one of the configurations shown in FIGS. 1 to 13 with different types of LED arrays as source 110, e.g. as one or more models or versions with different light output and control capability. In a simple version the fight fixture 105 would have a single string of LEDs controlled together as a single integrated light generator. Such as string of LEDs may include white LEDs of a single correlated color temperature (CCT), white LEDs of two or more CCT values that combine to give an intended overall CCT output of the white fixture output light, or white LEDs in combination with some number of specific color LEDs (e.g. red or amber) that combine to give an intended overall CCT output of the white fixture output light.

In lighting devices 100 that the manufacturer offers with more controllable capabilities, LEDs of different types may be combined at each point or the array, e.g. red (R), green (G), blue, (B) type LED emitters, RGB plus white (W) type LED emitters forming a combined RGBW emitter, RGBW plus amber (A) type LED emitters forming a combined RGBWA emitter, or the like. Alternatively, emitters of different colors like those noted above may be provided separately at different points of the array yet still offer tunable control of color characteristic of overall light output. With emitters of multiple color characteristics, which also are independently controllable, the lighting device can operate the source 110 in the fixture 105 to control mixing light from the different color light emitters at different relative intensities from those LEDs and offer a range of color tuning, including a range of different types of white light (with different spectral characteristics). One model with a particular implementation of such a source 110, might offer tunable white lighting, another model with a particular implementation of such a source 110 might offer a more complete range of visible spectral color selections, and another model with a higher resolution implementation of an array type source 110 might also support some degree of image display capability.

Returning more specifically to the device example of FIG. 14, the drawing illustrates an example of a controller 150 that may be used in lighting device 100. Controller 150 is coupled to control light source 110 to provide controlled general illumination. The processing system 160 provides the high level logic or "brain" of the lighting device 100. In the example, the processing system 160 is optionally coupled with one or more sensors 166, a wireless transceiver 180 and communication interface(s) 190.

In one implementation example, the controller 150 of the lighting device 100 includes a driver circuit 155 that is coupled to the light source 110 in the light fixture 105 to control light outputs generated by the emitter array in the light source 110. Although the driver circuit 155 is implemented as an element of the controller 150, the driver circuit 155 may be separately located from other elements of the controller 150, for example, in the light fixture 105. In an implementation of the source 110 as a single string or other grouping of LEDs, the driver would be a single channel driver of suitable capacity to drive the combined LEDs of the array. If the array of source 110 is logically divided into several groups for individual control of groups of the LEDs, the driver circuit 155 may be a multi-channel driver where each channel has suitable capacity to drive the combined LEDs of the particular group. In the examples in which the light source 110 is formed by a multi-pixel array or matrix of independently controllable light emitters, such as color characteristic and intensity controllable LED based pixel emitters, the driver circuit 155 may be a matrix type driver circuit, such as an active matrix driver or a passive matrix driver.

Processing system 160 includes a central processing unit (CPU), shown by way of example as a microprocessor (µP) 162, although other processor hardware circuitry may serve as the CPU. Processing system 160 also includes memory or other types of storage 170, which may include a random access memory and/or a read-only memory or the like. The CPU and storage/memories, for example, may be implemented by a suitable system-on-a-chip often referred to as a micro-control unit (MCU). In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the processor 162 of the controller 150. The processor 162 may include one or more cores. Although the illustrated example includes only one microprocessor 162, for convenience, a controller 150 for a device 100 supporting display capabilities as well as general illumination or in an implementation in which one host processing system 160 is intended to control a large number of light fixtures 105, may use a multi-processor architecture. Although not shown, the controller 150 may include additional or alternative types of processors, such as an arithmetic logic unit, a dedicated image processor, an image data decoder, etc.

Processing system 160 also includes one or more ports and/or interfaces 164. The ports and/or interfaces 164 couple the microprocessor 162 to various other elements of the lighting device 100, such as the driver circuit 155, one or more optional sensors 166 (such as motion or thermal sensors), the wireless transceiver 180, and/or the communication interface(s) 190. In a microprocessor based implementation, the ports and/or interfaces 164 may be suitable interface devices connected to an internal bus or the like of the system 160, which also connects to the processor 162 and the memory 170. In an MCU type implementation of the processing system 160, ports and/or interfaces 164 would be integrated on the system-on-a-chip with and internally connected to the processor 162 and the memory 170.

The processor 162, for example, by accessing programming 176 in the memory 170, controls operation of the driver circuit 155 and thus operations of the light fixture 105 via one or more of the ports and/or interfaces 164. In a similar fashion, one or more of the ports 164 enable processor 162 of the processing system 160 to use and communicate externally via communication interface(s) 190; and one or more of the ports 164 enable processor 162 of the processing system 160 to receive data regarding any condition detected by a sensor 166, for further processing.

As noted, the host processor system 160 is coupled to the communication interface(s) 190. In the example, the communication interface(s) 190 offer a user interface function or communication with hardware elements providing a user interface for the lighting device 100.

The communication interface(s) 190 also or instead may communicate with other control elements, for example, a host computer of a building control and automation system (BCAS). The communication interface(s) 190 may also support device communication with a variety of other equipment of other parties having access to the lighting device 100 in an overall/networked lighting system encompassing a number of lighting devices 100, e.g. for access to each lighting device 100 by equipment of a manufacturer for maintenance or access to an on-line server for downloading of programming instructions or configuration data for setting aspects of light fixture operation.

External communication by communication interface(s) 190, or communication within the internal components of lighting device 100, may be accomplished by any known manner of communication, including electrical communication, optical communication (such as visible light communication (VLC) or fiber optic communication), electromagnetic communications, or others.

As another example, processing system 160 may operate a wireless transceiver 180 (if included) to communicate information to or from a wireless device in the area illuminated by light source 110. Wireless transceiver 180, for example, may be a personal area network (PAN) transceiver, a transceiver operating in accordance with Bluetooth or Bluetooth Low Energy communication standards, a WiFi transceiver, an ultra-wide band (UWB) transceiver, or the like. Such communications, for example, may allow a user to configure or control operations of the lighting device 100 or provide an alternative media for the network type communication discussed above relative to the communication interface 190.

Control functions may be implemented by program instructions or program(s) 176, setting data 172 or a combination of program instructions and data, which are stored in the storage/memories 170.

Apparatuses implementing functions like those of configurable lighting device 100 may take various forms. For example, a lighting device 100 may have all of the above hardware components on or within a single hardware platform as generally shown in FIG. 14, for example, integrated with a single light fixture 105 of one of the earlier examples. Alternatively, some components attributed to the lighting device 100 may be separated from the light fixture 105 with the light source 110, in different somewhat separate units. In a particular example using separate units, one set of the hardware components of some or all of the controller 150 may be separated from one or more instances of the controllable light fixture 105, e.g. such that one host processor system 160 may control several light fixtures 105 each at a somewhat separate location. In such an example, one or more of the controlled light fixtures 105 are at a location remote from the one host processor system 150. In such an example, a driver circuit 155 may be located near or included in each light fixture 105. For example, one set of intelligent components, such as the microprocessor 123, may control/drive some number of driver circuits 155 and associated controllable light fixtures 105. Alternatively, there may be one overall system of one or more driver circuits 155 located at or near the host processor system 160 for driving some number of light fixtures 105. It also is envisioned that some lighting devices may not include or be coupled to all of the illustrated elements, such as the sensor(s) 166, the transceiver 180 and/or the communication interface(s) 190. For convenience, further discussion of the lighting device 100 of FIG. 14 will assume an intelligent implementation of the lighting device 100 that includes at least the illustrated components.

Figure 15A:
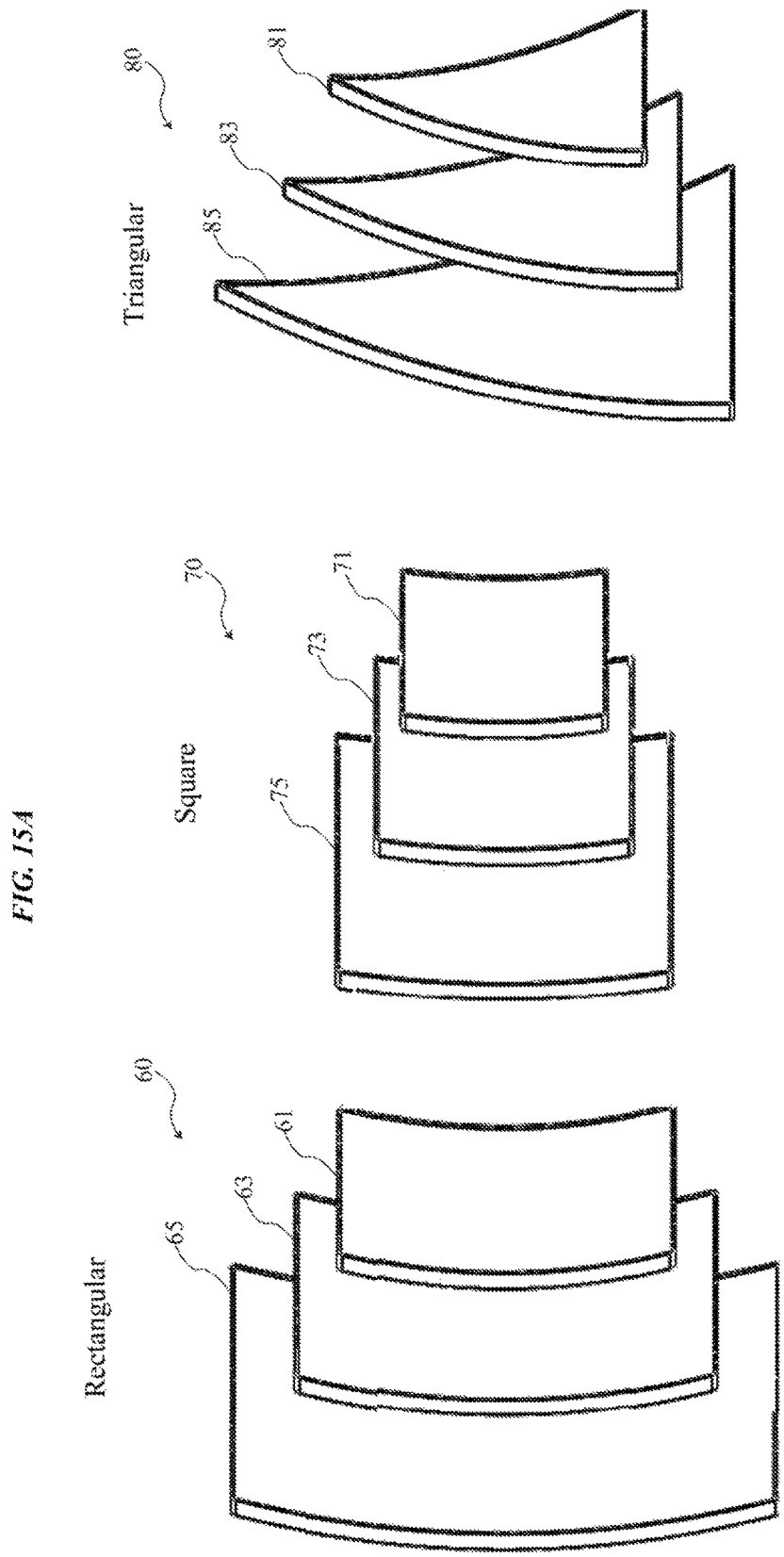
FIGS. 15A and 15B illustrate a possible set of standard sizes and shapes of concave (FIG. 15A) and convex (FIG. 15B) light fixtures, as might make up a product line of such light fixtures.
Figure 15B:
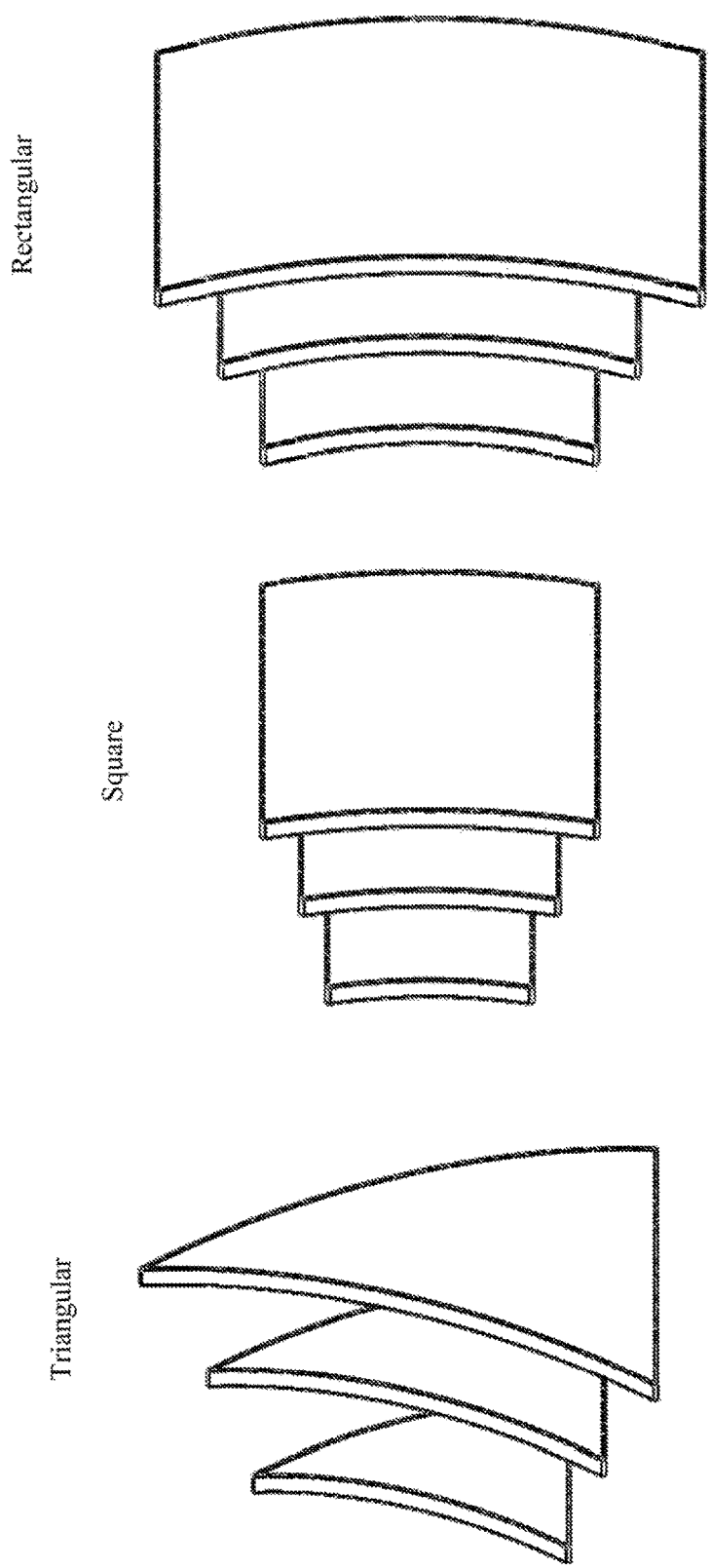

FIGS. 15A and 15B illustrate a possible set of standard sizes and shapes of concave and convex light fixtures, as might make up a product line of such light fixtures, as a manufacturer might offer for a range of applications, including open ceiling applications, large space applications and/or modular arrangements of fixtures. The convex light fixtures of FIG. 15B are generally similar, particularly as to size and dimensions, to the concave light fixtures of FIG. 15A, therefore discussion here will mainly refer to the examples of FIG. 15A. The drawing shows non-square rectangular light fixtures 60 of small (61), medium (63) and large sizes. The drawing shows square light fixtures 70 of small (71), medium (73) and large sizes. The non-square rectangular light fixtures 60 and the square light fixtures 70 may have structures similar to the structure of the light fixture 20 in the example of FIGS. 2 to 5. The triangular light fixtures 80 may have structures similar to the structure of the light fixture 20 in the example of FIGS. 8 to 11. The example fixtures shown in FIG. 15A are concave; and as shown in FIG. 15B, a manufacturer may offer a product line in similar shapes and sizes but with convex curvatures as in the examples of FIGS. 6, 7, 12 and 13, but in the various sizes shown in FIG. 15B. The convex variants may be provided instead of or in addition to the concave examples shown in FIG. 15A. Also, the three sizes are shown by way of examples, and a particular manufacture may offer only two sizes or may offer more standard sizes in any or all of the illustrated shapes.

Example light fixtures for open ceiling applications or the like may have a minimum of at least approximately 32 inches. For example, for a small size fixture 61, 71 or 73, the shorted dimension is approximately 32 inches. For a small square fixture 71, the other dimension would be 32 inches in the example. For a fixture having one dimension longer than the other, a rectangular fixture 60 or a triangular fixture 80 in the product line example of FIG. 15A, the longer dimension may be at least approximately 48 inches. In the example, however, the longer dimension is 1.618 times shorter dimension. Hence, for the small size fixture 61 or 81, the longer dimension is approximately 51.8 inches.

A medium sized fixture 63, 73 or 83, for example, may have a base dimension of approximately 40 inches. A large sized fixture 65, 75 or 85 might have a base dimension of approximately 52 inches. For a square shaped fixture 73 or 75, both dimensions would be the same. For triangular fixture 80 or a rectangular (non-square) fixture 60, the longer dimension would be approximately 1.618 time the base dimension. The long dimension of the medium size fixture 63 or 83 would be approximately 64.7 inches, and the long dimension of the large fixture 65 or 85 would be approximately 84.1 inches.

The curved light fixtures discussed herein and shown in the drawings are readily adaptable to modular deployments, particularly when offered in mass produced quantities in one or more standardized sizes as outlined above relative to FIGS. 15A and 15B. In a modular arrangement, any number of the curved light fixtures can be mounted in proximity to each other to provide a number of light fixtures suitable to a particular lighting application and in an aesthetically desirable pattern. In such a modular arrangement, a system includes two or more of the curved light fixtures. In order to facilitate mounting of a first light fixture near a second light fixture with predetermined edges facing towards each other in the modular design arrangement, the distance between vertices at ends of a predetermined edge of the perimeter of the diffuser (or back panel or housing corners) of the first fixture is approximately the same as the distance between vertices at ends of a predetermined edge of the perimeter of the diffuser (or back panel or housing corners) of the second fixture.

Figure 17:
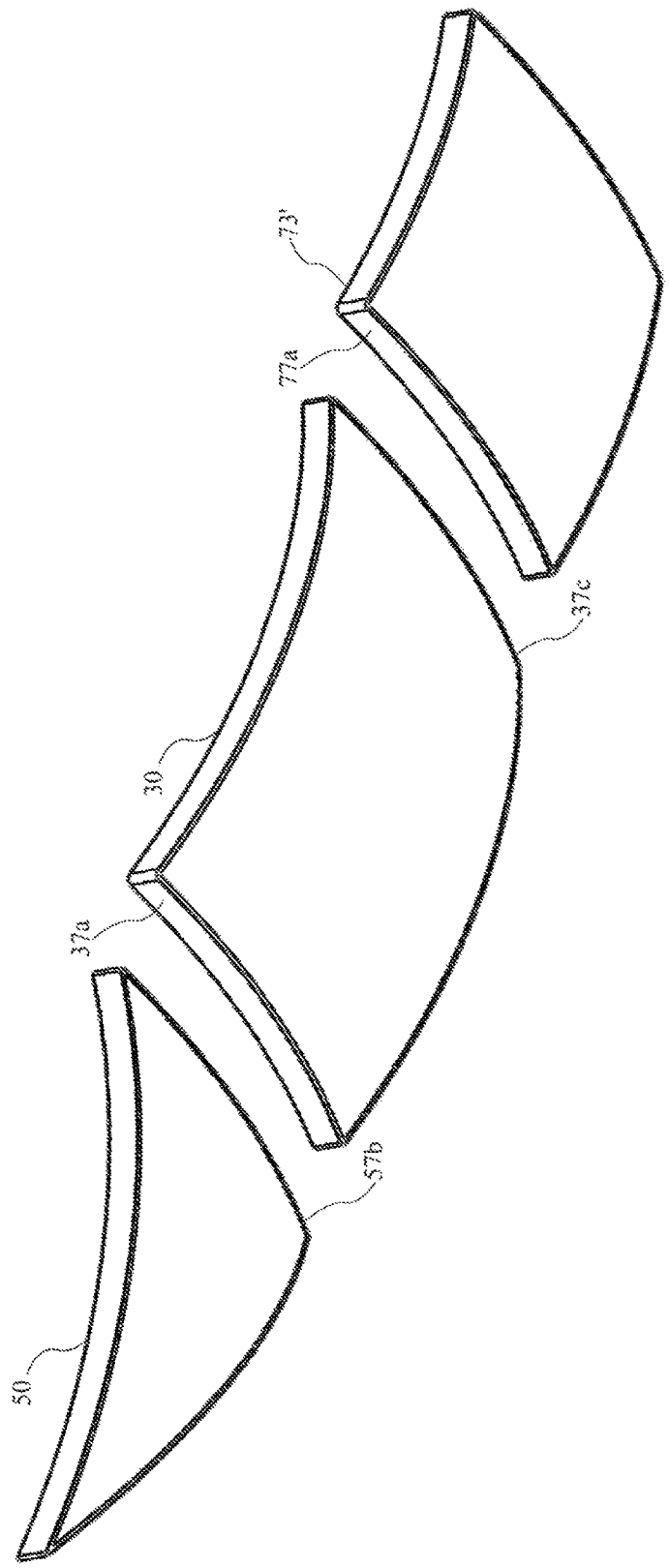
FIG. 17 shows an example of a system having three example light fixtures mounted in a modular design arrangement.
Figure 18:
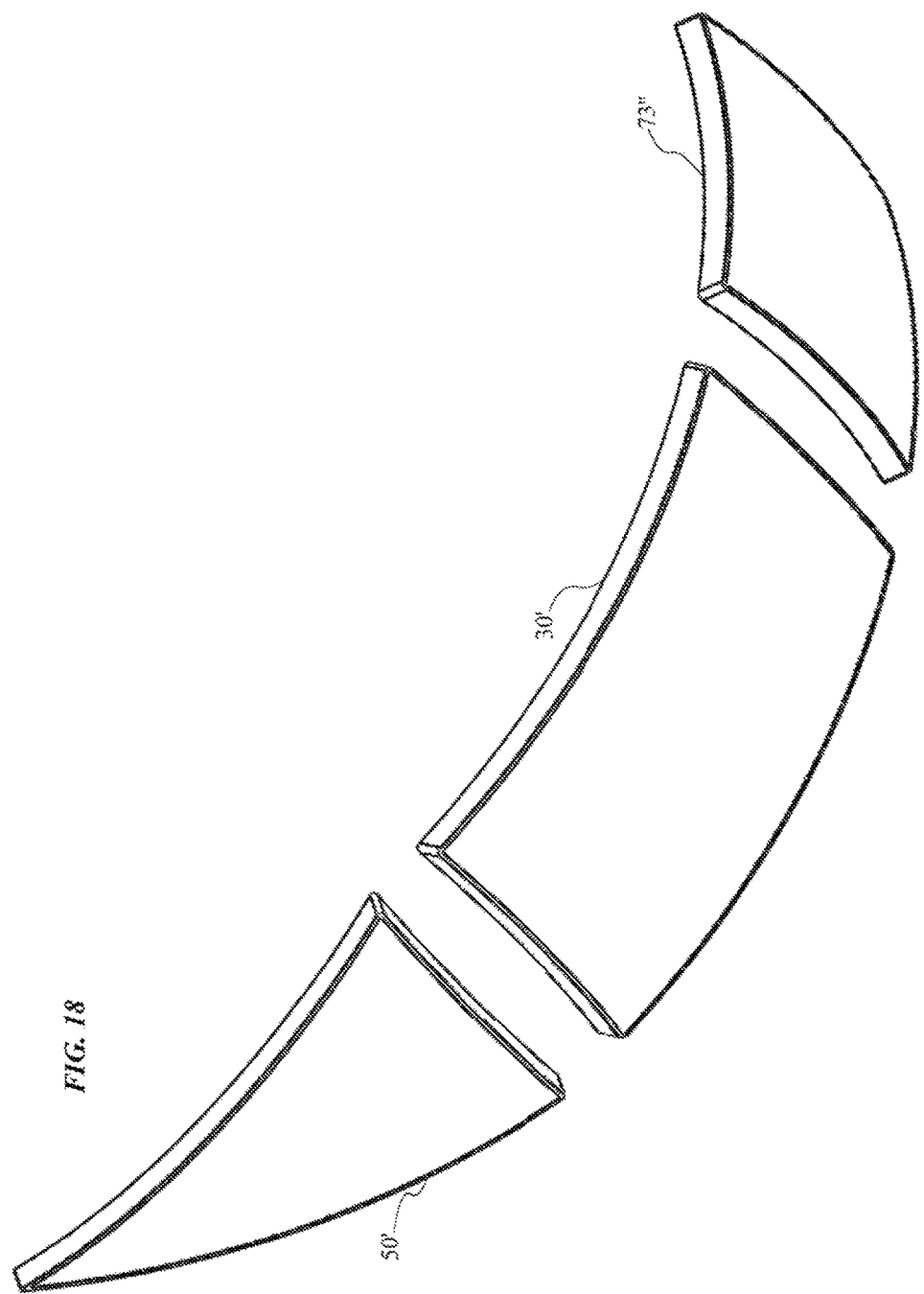
FIG. 18 depicts another example of a system having three example light fixtures mounted in a modular design arrangement.

It may be helpful to consider a few simple examples of possible layouts of modular design arrangements, with respect to FIGS. 16 to 18. For convenience, those examples include two or three of the curved light fixtures. It should be apparent that any number of light fixtures may be included in a particular arrangement. Also, the examples include convex type light fixtures. It should be apparent that similar arrangements may utilize concave type light fixtures or a mixture of convex type light fixtures and concave type light fixtures.

FIG. 16 illustrates an example of a system having two light fixtures mounted in a first modular design arrangement. The illustrated arrangement includes a three-sided convex light fixture 50 like the fixture shown in FIGS. 12 and 13 and a four-sided convex light fixture 30 like the fixture shown in FIGS. 6 and 7.

The sidewall 57*b* of light fixture 50 is nearest to the light fixture 30, and the sidewall 37*a* of the light fixture 30 is nearest to the light fixture 50. The length dimension of the facing sidewalls 57*b* and 37*a* (corner to corner) is the same. For example, the light fixtures 50 and 30 are from the same product category, e.g. medium sized fixtures as discussed above relative to FIGS. 15A and 15B. Although not visible in the assembled view, the fixtures 50, 30 with the same length of facing sidewalls will have facing perimeters of the respective contoured diffusers and back panels that have corresponding length dimensions (vertex to vertex). For example, the light fixture 50 will have an edge of the diffuser facing towards an edge of the diffuser within the light fixture 30, and the distance between vertices at ends of that edge of the perimeter of the diffuser of the light fixture 50 is approximately the same as the distance between vertices at ends of the facing edge of the perimeter of the diffuser of the light fixture 30. Similarly, the light fixture 50 will have an edge of the back panel facing towards an edge of the back panel within the light fixture 30, and the distance between vertices at ends of that edge of the perimeter of the back panel of the light fixture 50 is approximately the same as the distance between vertices at ends of the facing edge of the perimeter of the back panel of the light fixture 30.

FIG. 17 shows an example of a system having three example light fixtures 50, 30 and 73'. The light fixtures 50 and 30 are the same as in the example of FIG. 16 and are located in nearby relationship to each other as shown an described in the example of FIG. 16. The additional light fixture 73' is in the same size category, for example, a medium sized fixture. The additional light fixture 73' in the example of FIG. 17 is a square light fixture and is similar to the light fixture 73 in FIG. 15A except that light fixture 73' is convex (similar in structure to the convex rectangular light fixture example of FIGS. 2 to 5).

The sidewall 37*c* of light fixture 30 is nearest to the square light fixture 73', and the sidewall 77*a* of the light fixture 73' is nearest to the light fixture 30. The length dimension of the facing sidewalls 37*c* and 77*a* (corner to corner) is the same. For example, the light fixtures 30 and 73' are from the same product category, e.g. medium sized fixtures as discussed above relative to FIG. 15A. Although not visible in the assembled view, the fixtures 30, 73' with the same length of facing sidewalls will have facing perimeters of the respective contoured diffusers and back panels that have corresponding length dimensions (vertex to vertex). For example, the light fixture 30 will have an edge of the diffuser facing towards an edge of the diffuser within the light fixture 73', and the distance between vertices at ends of that edge of the perimeter of the diffuser of the light fixture 30 is approximately the same as the distance between vertices at ends of the facing edge of the perimeter of the diffuser of the light fixture 73'. Similarly, the light fixture 30 will have an edge of the back panel facing towards an edge of the back panel within the light fixture 73', and the distance between vertices at ends of that edge of the perimeter of the back panel of the light fixture 30 is approximately the same as the distance between vertices at ends of the facing edge of the perimeter of the back panel of the light fixture 73'.

FIG. 18 depicts another example of a system having three example light fixtures. The arrangement includes light fixtures 50', 30' and 73" that are essentially similar to the light fixtures in the example of FIG. 17. The dimensions of the light fixtures 50', 30' and 73" are somewhat different than those shown in FIG. 17. For example, light fixtures 50', 30' and 73" may be large sized light fixtures. The dimensional relationships of the sidewalls, and perimeter edges of the light fixtures 50', 30' and 73" as between those light fixtures are essentially similar to dimensional relationships of the light fixtures in the example of FIG. 17. The various fixtures 50', 30' and 73" are shown, however, in a somewhat different angular relationship. The differences in sizes and angular positioning results in a different appearance of the modular arrangement, and the larger fixtures may provide more light diffused over a larger area, for example, to adapt the arrangement to provide intimate area lighting for a larger one of several areas intended for separate usage and/or functions within a large space and/or having a high ceiling.

A lighting device with a light fixture of any type disclosed by way of example herein may be implemented as a generally standalone device 100 with a light fixture 105 and controller 150 (as in FIG. 14), in a variant in which one controller 150 controls a number of light fixtures 105, or in a networked system of such devices. The networked arrangement may be particularly advantages where a deployment utilizes a number of the light fixtures selected from a product line like that of FIGS. 15A and 15B, in one or more coordinated modular arrangements each as discussed relative to FIGS. 16 to 18 in some number of areas of a premises, e.g. to provide intimate area lighting in areas intended for separate usage and/or functions within a large space and/or having a high ceiling.

Figure 19:
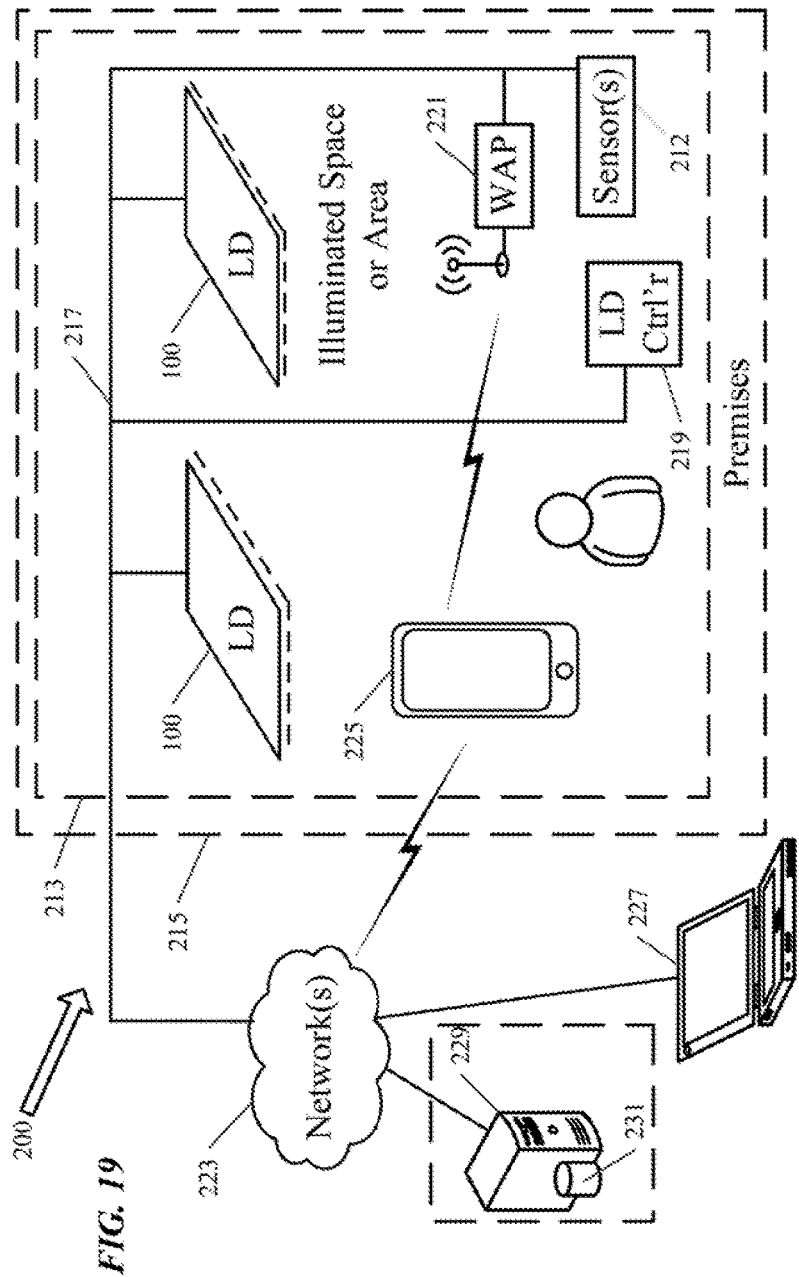
FIG. 19 is a high-level functional block diagram of a system including a number lighting devices similar to that of FIG. 14, which may communicate with other system elements at a premises and/or with external computers via a wide area network.

It may be helpful to consider a high-level example of a system including a number of implementations of lighting devices 100, with reference to FIG. 19, which illustrates a networked example 200 of an intelligent lighting system for providing lighting for general illumination or the like in a space 213 at a premises 215. The system 200 may also enable communication of configuration or setting data, to at least one lighting device (LD) 100 of any of the types discussed herein.

The system example 200 shown in the drawing includes a number of such lighting devices (LD) 100. For purposes of discussion of FIG. 19, it is assumed that each lighting device 100 generally corresponds in structure of one of the light fixture examples of FIGS. 1 to 13 and some or all are mounted in a modular arrangement as discussed above relative to the examples of FIGS. 16 to 18, and the source and electronics generally of each such intelligent light device conform to the discussion of the block diagram illustration of a lighting device 100 in FIG. 14. The example of the lighting system 200 in FIG. 19 also includes a number of other devices or equipment configured and coupled for communication with at least one of the lighting devices 100.

In the lighting system 200 of FIG. 19, the lighting devices 100, as well as some other elements of system 200, are installed within the space or area 213 to be illuminated at the premises 215. This area may be a room or part of a room, or the area may be a portion of a larger space designated for a particular type of usage or functionality. The premises 215 may be any location or locations serviced for lighting and other purposes by such a system 200 of the type described herein. Lighting devices, such as lighting devices 100, that are installed to provide general illumination lighting in the premises 215 typically comply with governmental building codes (of the respective location of the premises 215) and/or lighting industry standards. Most of the examples discussed herein focus on indoor building installations, for convenience, although the system may be readily adapted to outdoor lighting. Hence, the example of lighting system 200 provides controllable lighting (e.g. for general illumination) and possibly other services in a number of service areas in or associated with a building, such as various parts of all or sub-areas of a large space, rooms, hallways, corridors or storage areas of a building and any outdoor area associated with a building. Any building forming or at the premises 215, for example, may be an individual or multi-resident dwelling or may provide space for one or more enterprises and/or any combination of residential and enterprise facilities.

A premises 215 may include any number of such buildings; and in a multi-building scenario, the premises may include outdoor spaces and lighting in areas between and around the buildings, e.g. in a campus (academic or business) configuration.

The system elements, in a system like lighting system 200 of FIG. 19, may include any number of lighting devices 100 as well as one or more lighting controllers 219. The lighting controller 219 may be an automated device for controlling lighting, e.g. based on timing conditions; and/or the lighting controller 219 may provide a user interface. Lighting device controller 219 may be configured to provide control of lighting related operations (e.g., ON/OFF, intensity or brightness, color characteristic(s), etc.) of any one or more of the lighting devices 100. A lighting controller 219, for example, may take the form of a switch, a dimmer, or a smart control panel including a graphical, speech-based and/or touch-based user interface, depending on the functions to be controlled through the device 219.

A lighting device 100 may include a sensor (as in FIG. 14). In the example, other system elements may also include one or more standalone implementations of sensors 212. Sensors, for example, may be used to control lighting functions in response to various detected conditions, such as occupancy or ambient light. Other examples of sensors include light or temperature feedback sensors that detect conditions of or produced by one or more of the lighting devices. If separately provided, the sensors may be implemented in intelligent standalone system elements such as shown at 212 in the drawing. Alternatively, sensors may be incorporated in one of the other system elements, such as one or more of the lighting devices 100 and/or the lighting controller 219.

The on-premises system elements 100, 212, 219, in a system like the system 200 of FIG. 19, are coupled to and communicate via a data network 217 at the premises 215. The data network 217 may be a wireless network, a cable network, a fiber network, a free-space optical network, etc.; although the example shows connection lines as may be used in a hard-wired or fiber type network implementation. The data network 217 in the example also includes a wireless access point (WAP) 221 to support communications of wireless equipment at the premises (e.g. for an installation in which none of the lighting devices 100 includes a wireless transceiver 190 or an installation in which the network 217 provides more general data communication services at the premises 215. For example, the WAP 221 and network 217 may enable a user terminal for a user to control operations of any lighting device 100 at the premises 213 and/or to access an external data network 223, such as the Internet. Such a user terminal is depicted in FIG. 19, for example, as a mobile device 225 within premises 215, although any appropriate user terminal may be utilized.

However, the ability to control operations of a lighting device 100 or group of such devices 100 may not be limited to a user terminal accessing data network 217 via WAP 221 or other on-premises point of access to the network 217. Alternatively, or in addition, a user terminal such as laptop 227 located outside premises 215, for example, may provide the ability to control operations of one or more lighting devices 100 via one or more other networks 223 and the on-premises data network 217.

Network(s) 223 may include, for example, a local area network (LAN), a metropolitan area network (MAN), a wide area network (WAN) or some other private or public network, such as the Internet.

Data network communications allow installation of programming, setting data for operational parameters such as illumination attributes, etc. Such data communications also may allow selection among installed setting files in any lighting device 100 that stores more than one setting data file. In another example, a memory device, such as a secure digital (SD) card or flash drive, containing setting data or the like may be connected to one or more of the on-premises system elements 100, 212 or 219 in a system like system 200 of FIG. 19 for upload thereof into a lighting device 100 or other system elements 212 or 219.

For lighting operations, the system elements (100, 212 and/or 219) for a given service area 213 are coupled together for network communication with each other through data communication media to form a portion of a physical data communication network 217. Similar elements in other service areas of the premises 215 are coupled together for network communication with each other through data communication media to form one or more other portions of the physical data communication network 217 at the premises 215. The various portions of the network 217 in the service areas in turn are coupled together to form a data communication network at the premises 215, for example to form a LAN or the like, as generally represented by network 217 in FIG. 19. Such data communication media may be wired and/or wireless, e.g. cable or fiber Ethernet, Wi-Fi, Bluetooth, or cellular short range mesh. In many installations, there may be one overall data communication network 217 at the premises. However, for larger premises and/or premises that may actually encompass somewhat separate physical locations, the premises-wide network 217 may actually be built of somewhat separate but interconnected physical networks utilizing similar or different data communication media.

System 200 also includes a server 229 and a database 231 accessible to a processor of server 229. Although FIG. 19 depicts server 229 as located outside premises 215 and accessible via network(s) 223, this is only for simplicity and no such requirement exists. Alternatively, server 229 may be located within premises 215 and accessible via network 217. In still another alternative example, server 229 may be located within any one or more system element(s), such as lighting device 100, lighting controller 219 or sensor 212. Similarly, although FIG. 19 depicts database 231 as physically proximate server 229, this is only for simplicity and no such requirement exists. Instead, database 231 may be located physically disparate or otherwise separated from the server 229 and logically accessible by a processor of the server 229, for example via network 217 and/or 223.

Database 231 in this example is a collection of files for use in conjunction with one or more of lighting devices 100 in premises 215 and/or similar devices 100 of the same or other users in other areas or at other premises. The files, for example, may files of program instructions or updates, configuration files, files for illumination settings, etc. Each lighting device 100 in the system is configured to receive some of the information from the database 231 to configure the lighting device and perform operations as described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A light fixture, comprising:
a housing having a back panel and two or more sidewalls, and at least one interior surface on the back panel or the sidewalls being reflective;
a diffuser supported by the housing opposite and at a distance from an interior surface of the back panel; and
a light source in the housing to emit light for passage through the diffuser,
wherein each of the back panel of the housing and the diffuser comprises:
 a three-dimensional compound curvature; and
 a respective perimeter comprising at least two edges connected at vertices, wherein each of the at least two edges of the respective perimeter is a two-dimensional plane curve, and wherein the at least two edges are not coplanar with each other.

2. The light fixture of claim 1, wherein:
the vertices of the respective perimeter of the back panel are all coplanar with one another; and
the vertices of the respective perimeter of the diffuser are all coplanar with one another.

3. The light fixture of claim 2, wherein there are three vertices of the respective perimeter of the back panel and there are three vertices of the respective perimeter of the diffuser.

4. The light fixture of claim 3, wherein the back panel and the diffuser are configured to appear approximately triangular in a two-dimensional view from a perspective along a central axis of the back panel and the diffuser.

5. The light fixture of claim 2, wherein there are four vertices of the perimeter of the back panel and there are four vertices of the perimeter of the diffuser.

6. The light fixture of claim 5, wherein the back panel and the diffuser are configured to appear approximately in the shape of a trapezoid, a rhombus, a square or a non-square rectangle in a two-dimensional view from a perspective along a central axis of the back panel and the diffuser.

7. The light fixture of claim 2, wherein:
each two-dimensional plane curve edge of the perimeter of the back panel lies in a plane parallel to the central axis of the back panel and the diffuser and perpendicular to the plane of the vertices of the back panel; and
each two-dimensional plane curve edge of the diffuser lies in a plane parallel to the central axis of the back panel and the diffuser and perpendicular to the plane of the vertices of the diffuser.

8. The light fixture of claim 2, wherein at least one major surface of each sidewall lies in a plane parallel to a central axis of the back panel and the diffuser.

9. The light fixture of claim 1, wherein a ratio of a longer dimension of the diffuser to a perpendicular shorter dimension of the diffuser is approximately 1.6.

10. The light fixture of claim 9, wherein the shorter dimension is at least approximately 32 inches.

11. The light fixture of claim 1, wherein:
each two-dimensional plane curve edge of the perimeter of the back panel lies in a plane parallel to the central axis of the back panel and the diffuser; and
each two-dimensional plane curve edge of the diffuser lies in a plane parallel to the central axis of the back panel and the diffuser.

12. The light fixture of claim 1, wherein each three-dimensional compound curvature approximately corresponds in shape to a portion of a sphere.

13. The light fixture of claim 12, wherein the diffuser and back panel have approximately the same radius of curvature.

14. The light fixture of claim 12, wherein:
the three-dimensional compound curvature of the back panel approximately corresponds to a portion of a sphere of a first radius;
the three-dimensional compound curvature of the diffuser approximately corresponds to a portion of a sphere of a second radius; and
the second radius is different from the first radius.

15. The light fixture of claim 1, wherein at least the three-dimensional compound curvature of the diffuser is concave with respect to the direction of light output via the diffuser.

16. The light fixture of claim 1, wherein at least the three-dimensional compound curvature of the diffuser is convex with respect to direction of light output via the diffuser.

17. The light fixture of claim 1, wherein the light source comprises solid state light emitters mounted at locations on the interior surface of the back panel of the housing.

18. The light fixture of claim 17, wherein the solid state light sources are light emitting diodes (LEDs).

19. The light fixture of claim 18, wherein the LEDs are white LEDs.

20. The light fixture of claim 17, wherein at least some of the solid state emitters emit light of different color characteristics.

21. A light fixture, comprising:
a housing;
a light source in the housing; and
a diffuser supported by the housing so as to receive light from the source and diffuse the light for illumination, wherein the diffuser comprises:
   a three-dimensional compound curvature; and
   a perimeter comprising at least two edges connected at vertices, wherein each of the at least two edges is a two-dimensional plane curve, and wherein the at least two edges are not coplanar with each other.

22. The light fixture of claim 21, wherein the vertices are all coplanar with one another.

23. The light fixture of claim 22, wherein there are three vertices.

24. The light fixture of claim 23, wherein the diffuser is configured to appear approximately triangular in a two-dimensional view from a perspective along a central axis of the diffuser.

25. The light fixture of claim 22, wherein there are four vertices.

26. The light fixture of claim 25, wherein the diffuser is configured to appear approximately in the shape of a trapezoid, a rhombus, a square or a non-square rectangle in a two-dimensional view from a perspective along a central axis of the diffuser.

27. The light fixture of claim 21, wherein a ratio of a longer dimension of the diffuser to a perpendicular shorter dimension of the diffuser is approximately 1.6.

28. The light fixture of claim 27, wherein the shorter dimension is at least approximately 32 inches.

29. The light fixture of claim 21, wherein the three-dimensional compound curvature approximately corresponds in shape to a portion of a sphere.

30. A light fixture, comprising:
a housing;
a light source supported by the housing; and
an optical element supported by the housing, the optical element having a surface forming a light output surface of the light fixture, the optical element being located to receive light from the source and configured to supply at least some of the light for illumination via the output surface,
at least the surface of the optical element comprising:
   a three-dimensional compound curvature; and
   a perimeter comprising at least two edges connected at vertices, wherein:
      each of the at least two edges is a two-dimensional plane curve, and
      the at least two edges are not coplanar with each other.

31. The light fixture of claim 30, wherein the vertices are all coplanar with one another.

32. The light fixture of claim 31, wherein:
each two-dimensional plane curve edge of the perimeter lies in a plane parallel to a central axis of the three-dimensional compound curvature;
the plane of each two-dimensional plane curve edge of the perimeter is perpendicular to the plane of the vertices of the perimeter.

33. The light fixture of claim 32, wherein the optical element is a diffuser.

34. A system, comprising:
a first light fixture comprising:
   a first housing;
   a first light source in the first housing;
   a first diffuser supported by the first housing at a distance from the first source so as to receive light from the source and diffuse the light for illumination, wherein the first diffuser comprises:
      a three-dimensional compound curvature; and
      a first perimeter comprising at least two edges connected at vertices, wherein each of the at least two edges of the first perimeter is a two-dimensional plane curve, and wherein the at least two edges of the first perimeter are not all coplanar with each other; and
a second light fixture comprising:
   a second housing;
   a second light source the second housing;
   a second diffuser supported by the second housing at a distance from the second source so as to receive light from the source and diffuse the light for illumination, wherein the second diffuser comprises:
      a three-dimensional compound curvature; and
      a second perimeter comprising at least two edges connected at vertices, wherein each of the at least two edges of the second perimeter is a two-dimensional plane curve, and wherein the at least two edges of the second perimeter are not all coplanar with each other,
wherein, to facilitate mounting of the first light fixture near the second light fixture with predetermined edges facing towards each other, in a modular design arrangement:
the distance between vertices at ends of a predetermined edge of the first perimeter of the first diffuser is approximately the same as the distance between vertices at ends of a predetermined edge of the second perimeter of the second diffuser.

35. The system of claim 34, wherein:
each of the three-dimensional compound curvature of the first diffuser and the three-dimensional compound curvature of the second diffuser approximately corresponds to a portion of a sphere; and
the radius of curvature of the first diffuser is approximately the same as the radius of curvature of the second diffuser.

* * * * *